US008331982B2

(12) United States Patent
Hong et al.

(10) Patent No.: US 8,331,982 B2
(45) Date of Patent: Dec. 11, 2012

(54) MOBILE TERMINAL AND METHOD FOR CONTROLLING BROADCAST IN MOBILE TERMINAL

(75) Inventors: Sug Ky Hong, Seoul (KR); Sung Won Yoon, Yongin-si (KR); Hyun Ho Koh, Seoul (KR); Eui Soon Kim, Seoul (KR); Won Jong Lee, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 12/840,180

(22) Filed: Jul. 20, 2010

(65) Prior Publication Data

US 2011/0111795 A1     May 12, 2011

(30) Foreign Application Priority Data

Nov. 10, 2009   (KR) ........................ 10-2009-0107971

(51) Int. Cl.
*H04N 5/445* (2006.01)
(52) U.S. Cl. ................. 455/556.1; 455/412.2; 455/3.06; 725/50; 725/38; 725/110; 725/54
(58) Field of Classification Search ............... 455/556.1, 455/411, 550.1, 426.1, 552.1, 414.4, 3.01, 455/179.1, 154.1, 435.2, 3.06, 412.2; 725/50, 725/110, 54, 131, 38, 39, 1; 709/200, 231, 709/227; 705/67; 704/275; 370/389, 432
See application file for complete search history.

(56) References Cited

U.S. PATENT DOCUMENTS

| | | | | |
|---|---|---|---|---|
| 6,804,510 | B1 * | 10/2004 | Bates et al. | 455/414.4 |
| 2006/0105704 | A1 * | 5/2006 | Kim | 455/3.06 |
| 2007/0042757 | A1 * | 2/2007 | Jung et al. | 455/412.2 |
| 2007/0110056 | A1 * | 5/2007 | Hwang et al. | 370/389 |
| 2007/0110057 | A1 * | 5/2007 | Hwang et al. | 370/389 |
| 2007/0124359 | A1 * | 5/2007 | Hwang et al. | 709/200 |
| 2008/0216117 | A1 * | 9/2008 | Lee et al. | 725/39 |
| 2008/0222690 | A1 * | 9/2008 | Kim | 725/110 |
| 2009/0204996 | A1 * | 8/2009 | Kim et al. | 725/54 |
| 2009/0264101 | A1 * | 10/2009 | Jeong et al. | 455/411 |
| 2009/0280803 | A1 * | 11/2009 | Choi | 455/426.1 |
| 2009/0280808 | A1 * | 11/2009 | You et al. | 455/435.2 |
| 2009/0306991 | A1 * | 12/2009 | Yoon et al. | 704/275 |
| 2010/0106648 | A1 * | 4/2010 | Choi et al. | 705/67 |
| 2010/0311320 | A1 * | 12/2010 | Jung et al. | 455/3.01 |
| 2011/0283303 | A1 * | 11/2011 | Jung et al. | 725/1 |

* cited by examiner

*Primary Examiner* — Tan Trinh
(74) *Attorney, Agent, or Firm* — Lee, Hong, Degerman, Kang & Waimey

(57) ABSTRACT

A mobile terminal and a method for controlling broadcast in a mobile terminal are provided. The mobile terminal extracts broadcast guide receiving associated information for receiving broadcast guide information corresponding to a specific data type selected by a user from broadcast guide receiving associated information and receives broadcast guide information corresponding to the selected specific data type by using the extracted broadcast guide receiving associated information.

21 Claims, 45 Drawing Sheets

FIG. 4A
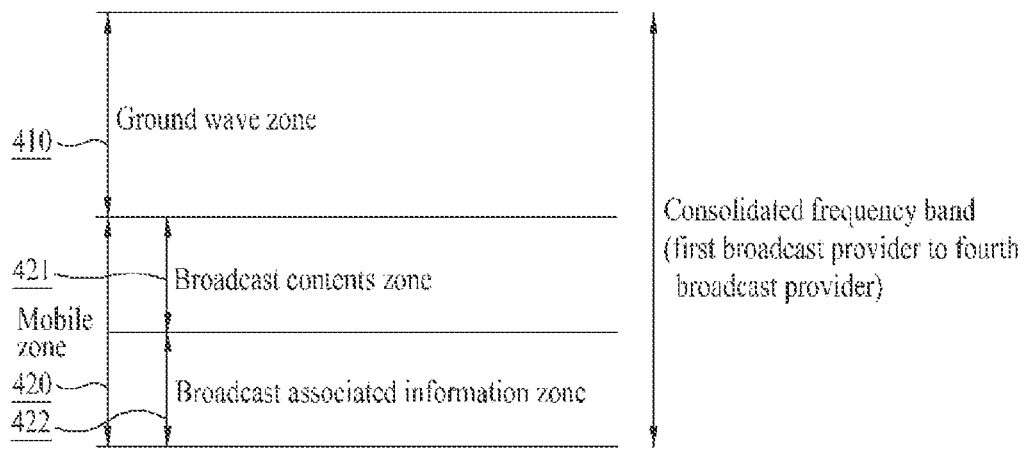
(a)
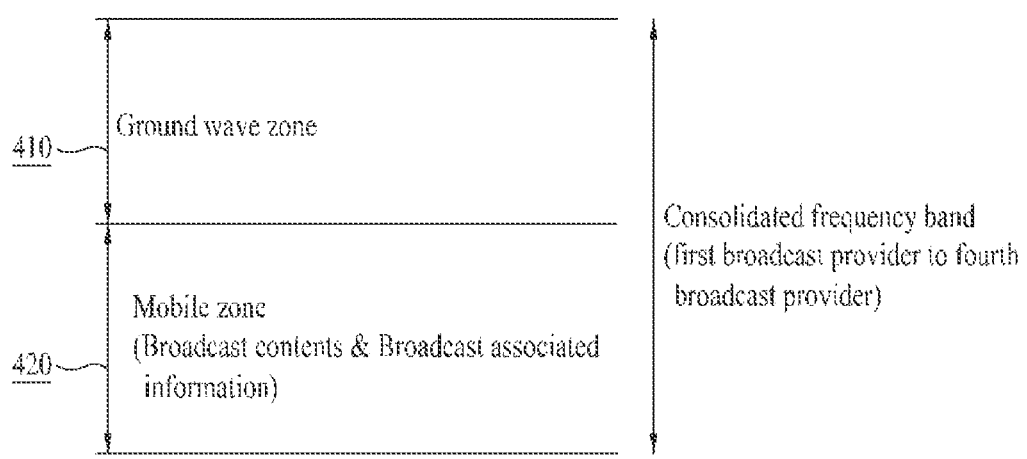
(b)

FIG. 4B
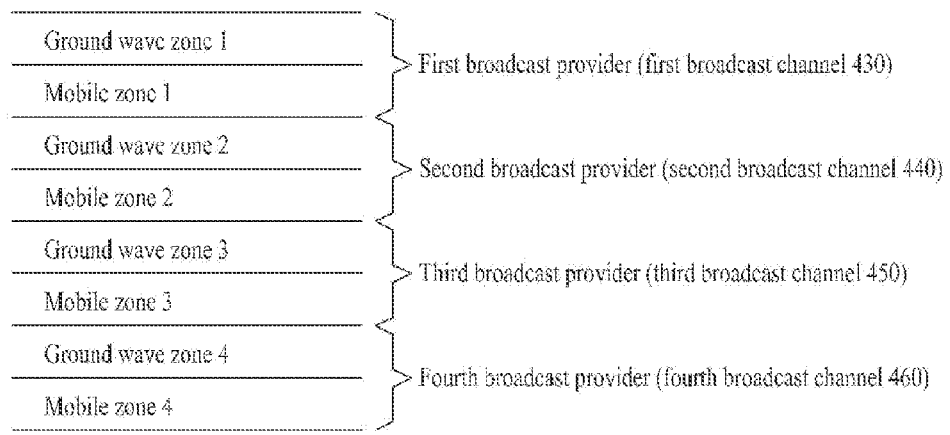
(a)
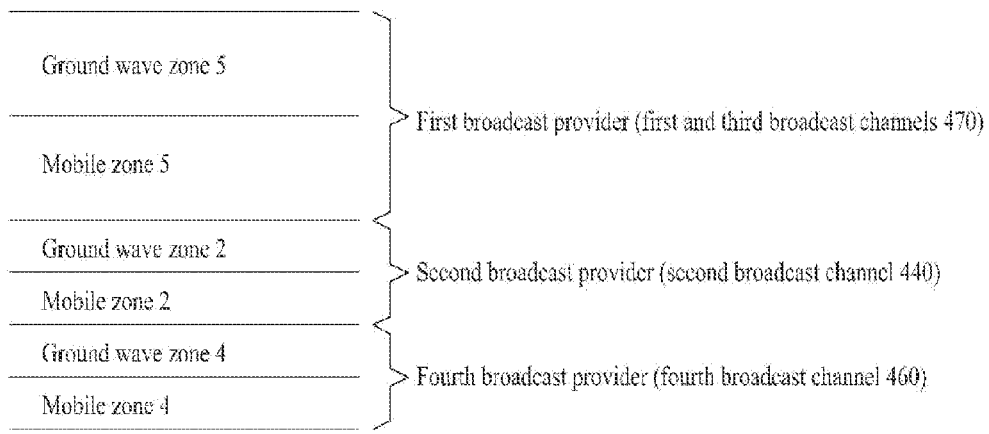
(b)

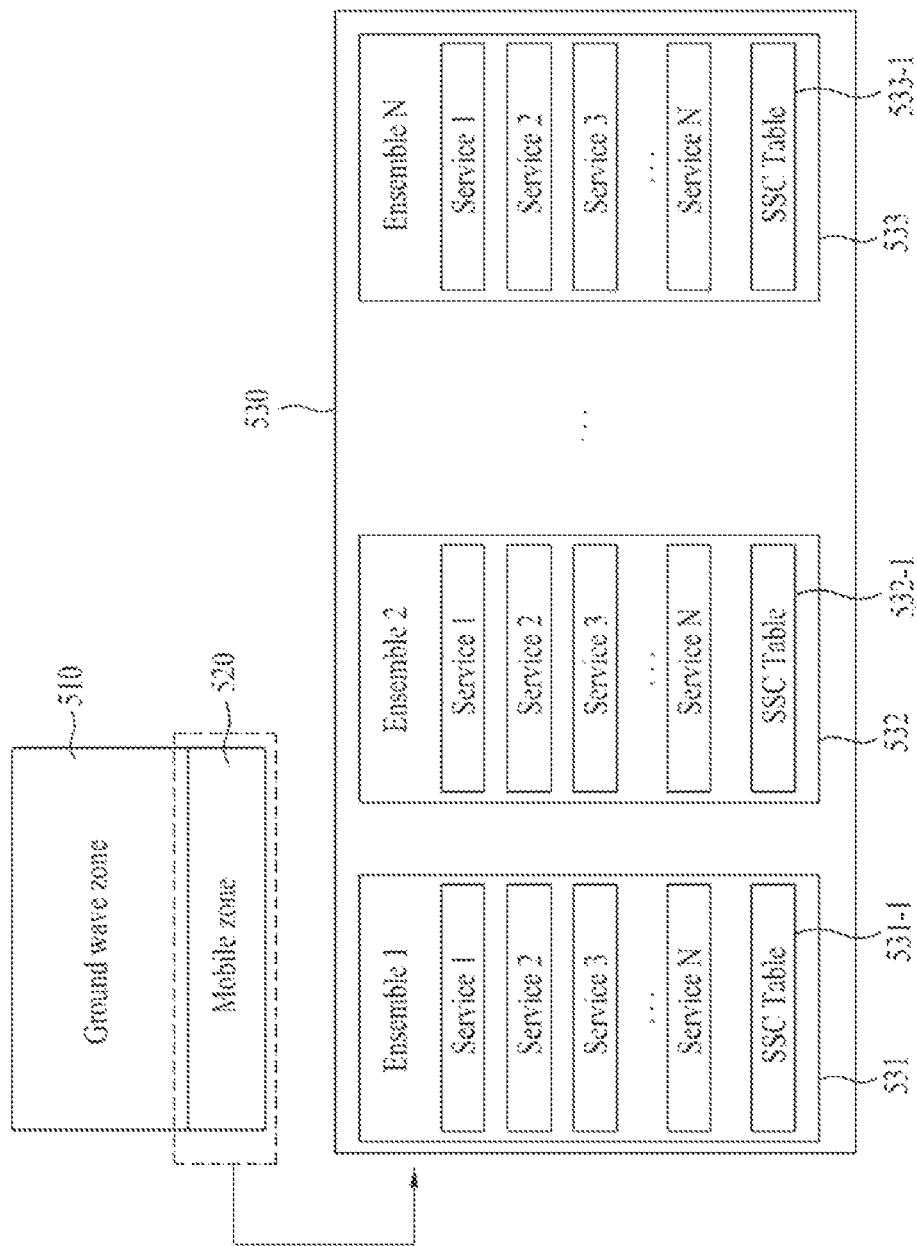

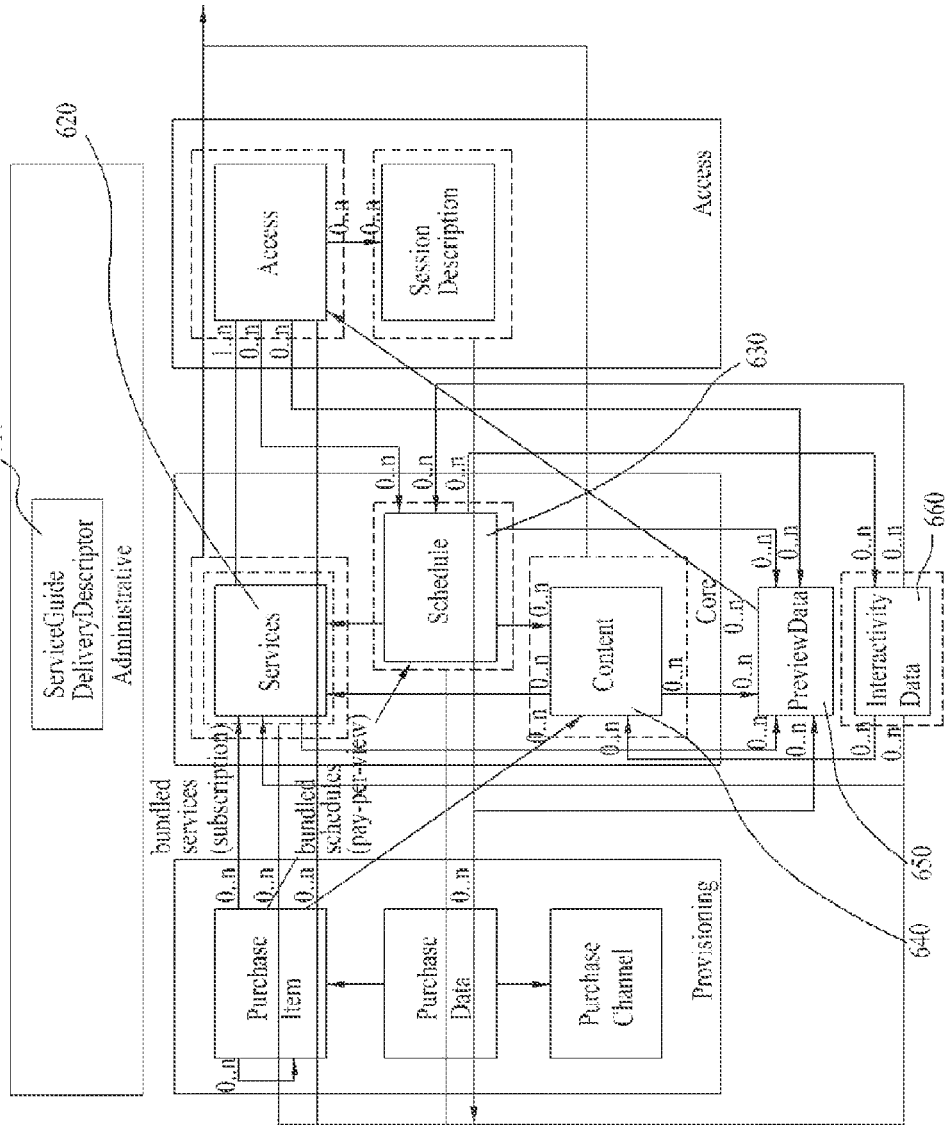

FIG. 7A

| Syntax | No. of Bits | Format |
|---|---|---|
| guide_access_table_MH_section() { | | |
|     table_id | 8 | 0xDC |
|     section_syntax_Indicator | 1 | '0' |
|     private_indicator | 1 | '1' |
|     reserved | 2 | '11' |
|     section_length | 12 | uimsbf |
|     table_id_extension { | 16 | uimsbf |
|         GAT_MH_protocol_version | 8 | uimsbf |
|         ensemble_id | 8 | uimsbf |
|     } | | |
|     reserved | 2 | '11' |
|     version_number | 5 | uimsbf |
|     current_next_Indicator | 1 | bslbf |
|     section_number | 8 | uimsbf |
|     last_section_number | 8 | uimsbf |
|     numb_SG_providers | 8 | uimsbf |
|     for ( i = 0; i<num_SG_providers; i++) { | | |
|         SG_provider_name_length | 8 | uimsbf |
|         SG_provider_name_text() | var | |
|         MH_service_id | 16 | uimsbf |
|         announcement_channel_tsi | 16 | uimsbf |
|     } | | |
|     } | | |
| } | | |

710 — for ( i = 0; i<num_SG_providers; i++) {
703 — SG_provider_name_text()
701 — MH_service_id
702 — announcement_channel_tsi

FIG. 7B

| | | |
|---|---|---|
| ensemble_id | | |
| } | | |
| reserved | 2 | '11' |
| version_number | 5 | uimsbf |
| current_next_indicator | 1 | bslbf |
| section_number | 8 | uimsbf |
| last_section_number | 8 | uimsbf |
| num_MH_services | 8 | uimsbf |
| for (I = 0; I<num_MH_services; ++I) | | |
| { | | |
| MH_service_id  ← 711 | 16 | uimsbf |
| multi_ensemble_service | 2 | uimsbf |
| MH_service_status | 2 | uimsbf |
| SP_Indicator | 1 | bslbf |
| short_MH_service_naem_length /*m*/ | 3 | uimsbf |
| short_MH_service_name | 16*m | |
| reserved | 2 | '11' |
| MH_service_category | 6 | uimsbf |
| num_components | 5 | uimsbf |
| IP_version_flag | 1 | bslbf |
| source_IP_address_flag | 1 | bslbf |
| HM_service_destination_IP_address_flag | 1 | bslbf |
| If(source_IP_address_flag) | | |
| source_IP_address_flag) | 32 or 128 | uimsbf |
| If(MH_service_destination_IP_address_flag)  ← 720 | | |
| MH_service_destination_IP_address | 32 or 128 | uimsbf |
| for (j =0; j<num_components; j++) | | |
| { | | |
| reserved | | |
| essential_component_indicator | | |
| component_destination_IP_address_flag | 1 | bslbf |
| port_num_count | 5 | uimsbf |
| component_destination_UDP_port_num | 16 | uimsbf |
| If(component_destination_IP_address_flag)  ← 730 | | |
| component_destination_IP_address | 32 or 128 | uimsbf |
| : | | |

FIG. 8

| Name | Type | Category | Cardinality | Description | Data Type |
|---|---|---|---|---|---|
| ServiceGuide Delivery Descriptor | E | | | The Service Guide Delivery Descriptor Contains the following attributes: id version  Contains the following elements: NotificationReception BSMList DescriptorEntry | |
| Descriptor Entry | E1 | NM/ TM | 1..N | An entry in the Service Guide Delivery Descriptor. Contains the following attribute: type Contains the following elements: GroupingCriteria, Transport, AlternativeAccessURL, ServiceGuideDeliveryUnit | |
| Transport | E2 | NM/ TM | 0..N | The pointer to the transport session delivering the Service Guide fragments within Service Guide Delivery Units announced in this DescriptorEntry. Contains the following attributes: ipAddress, port, srcIpAddress, transmissionSessionID, hasFDT | |
| fragmentType | A | NM/ TM | 0..1 | This field signals the type of an XML encoded BCAST Service Guide fragment, with the following values: 0 - unspecified 1 - 'Service' Fragment 2 - 'Content' fragment 3 - 'Schedule' Fragment 4 - 'Access' Fragment 5 - 'PurchaseItem' Fragment 6 - 'PurchaseData' Fragment 7- 'PurchaseChannel' Fragment 8 - 'PreviewData' Fragment 9 - 'InteractivityData' Fragment | unsigned Byte |

810 — ServiceGuide Delivery Descriptor
820 — Descriptor Entry
830 — Transport
840 — fragmentType

FIG. 9

| Data Field Name | Data Type |
|---|---|
| Service_Guide_Delivery_Unit { | |
|     Unit_Header { | |
|         extension_offset | uimsbf32 |
|         reserved | 16bits |
|         n_o_service_guide_fragments | uimsbf24 |
|         for(i=0; i< n_o_service_guide_fragments; i++) { | |
|             fragmentTransportID[i] | uimsbf32 |
|             fragmentVersion[i] | uimsbf32 |
|             offset[i] | uimsbf32 |
|         } | |
|     } | |
|     Unit_Payload { | |
|         for(i=0; i< n_o_service_guide_fragments; i++) { | |
|             fragmentEncoding[i] | uimsbf8 |
|             if(fragmentEncoding[i]=0) { | |
|                 fragmentType | uimsbf8 — 901 |
|                 XMLFragment | bytestring — 902 |
|             } | |
|         ... | |

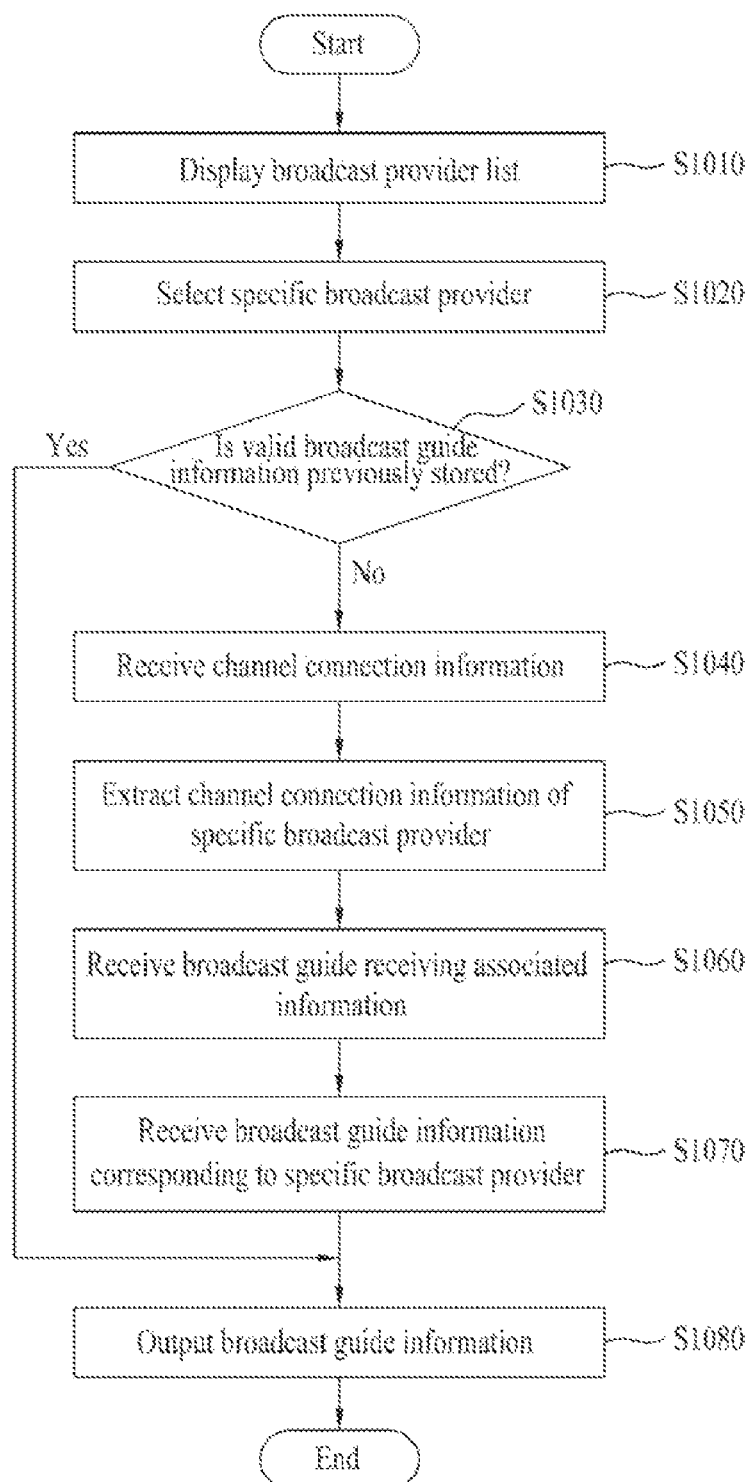

FIG. 13A
(a)
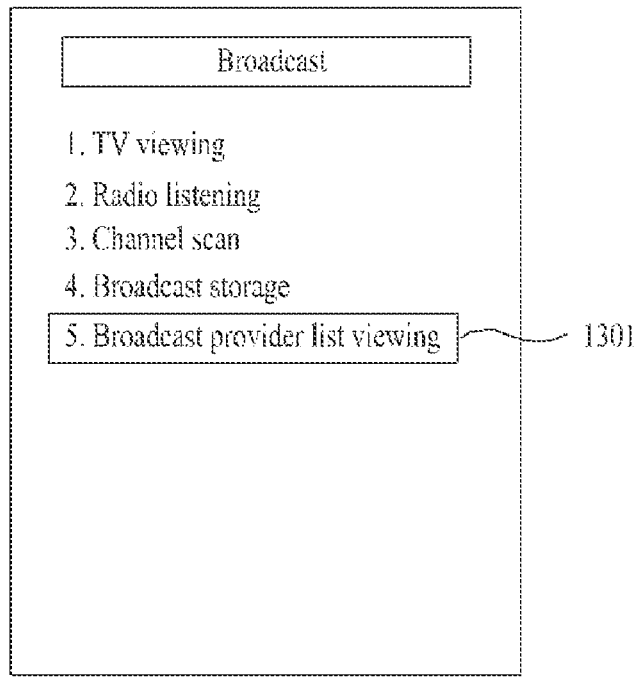
(b)
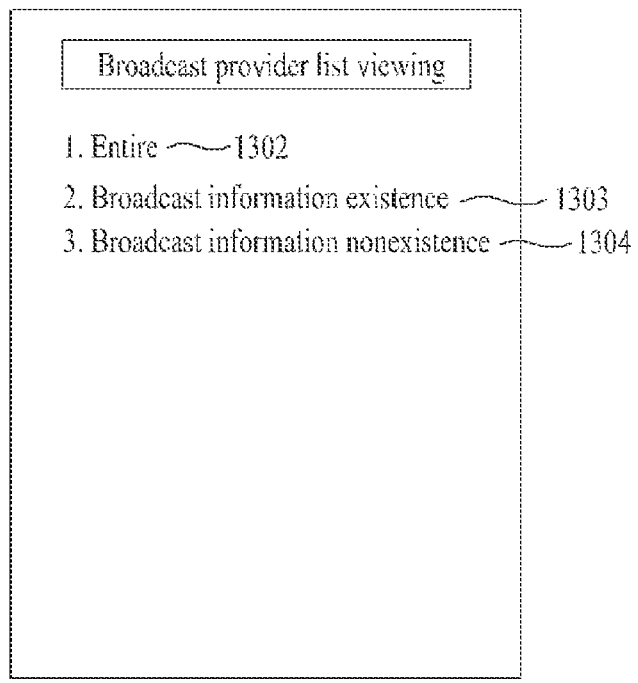

FIG. 13C
(a)
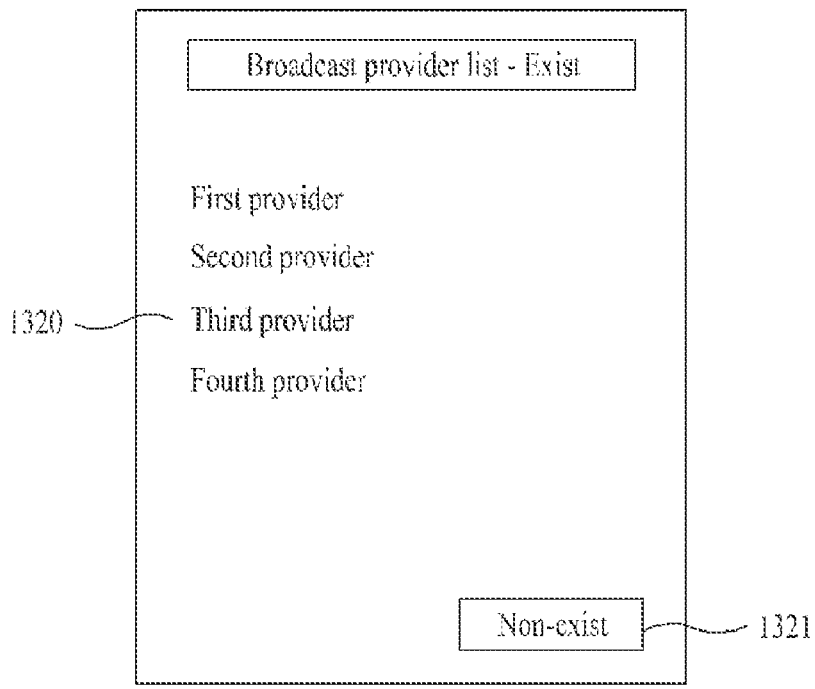
(b)
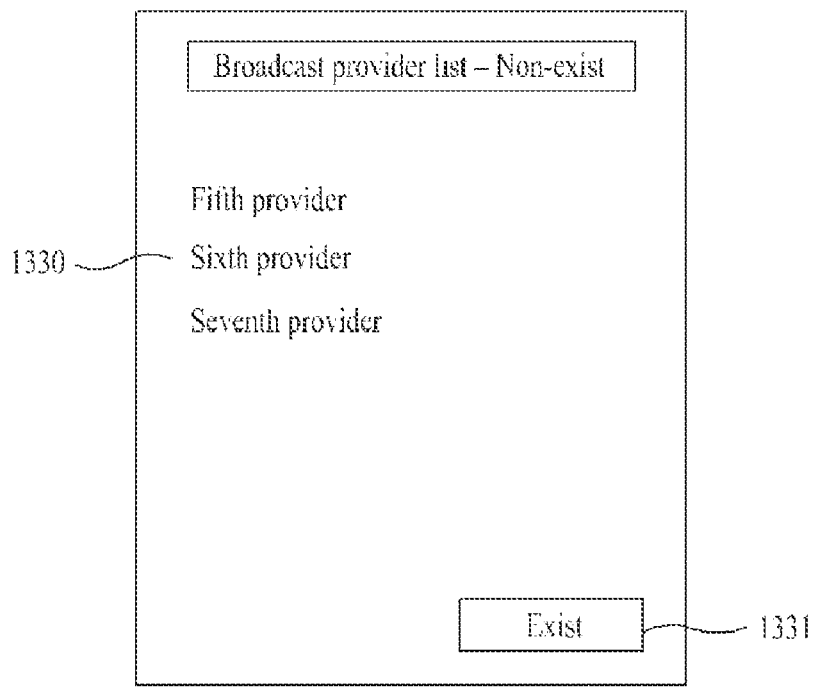

FIG. 13D
(a)
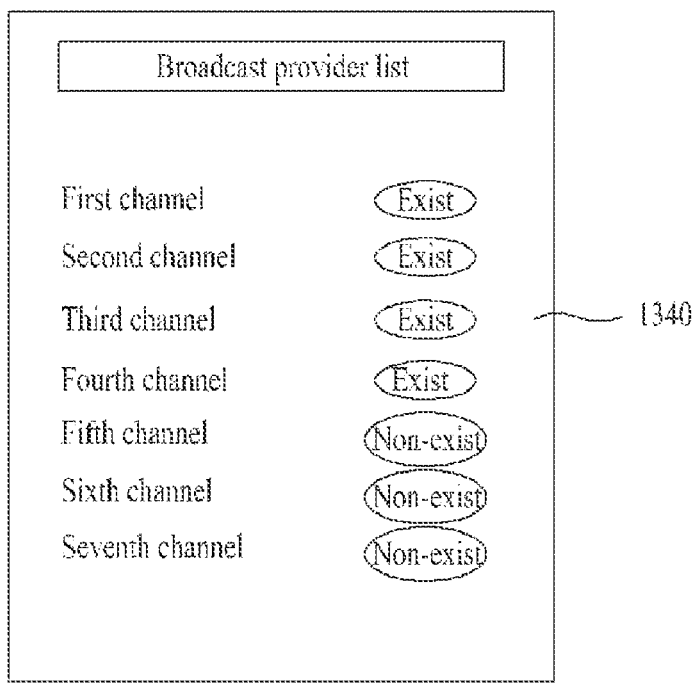
(b)
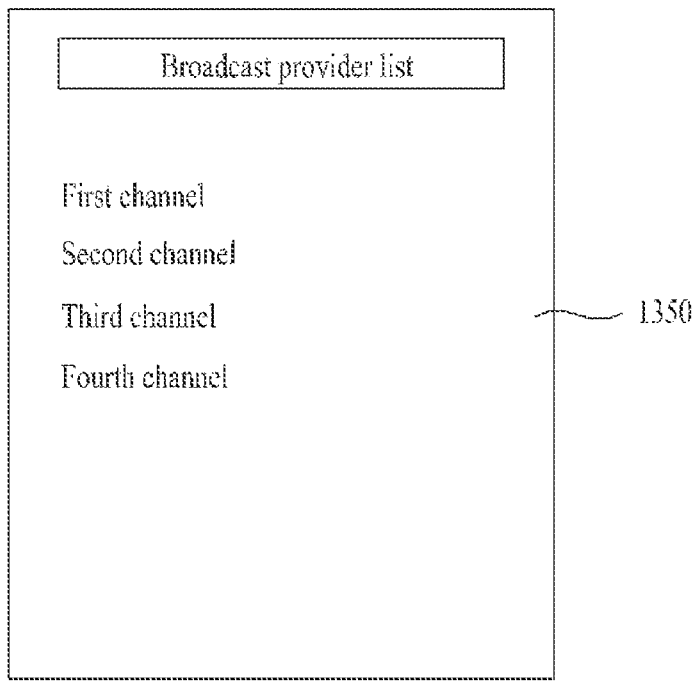

FIG. 14B
(a)
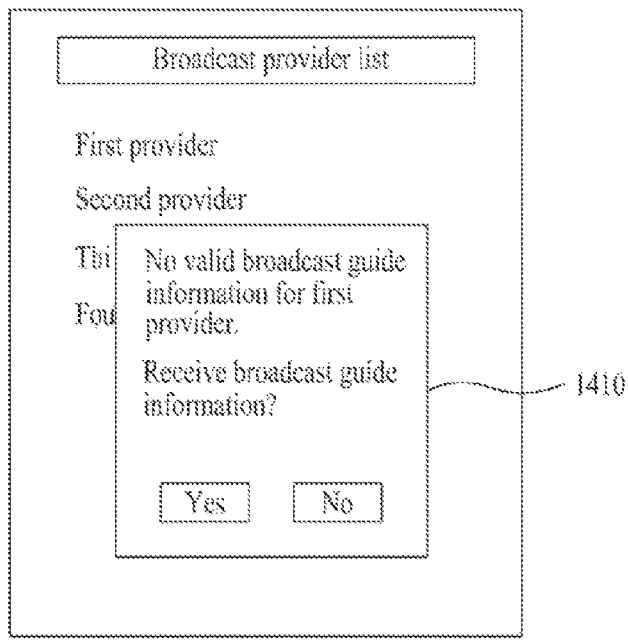
(b)
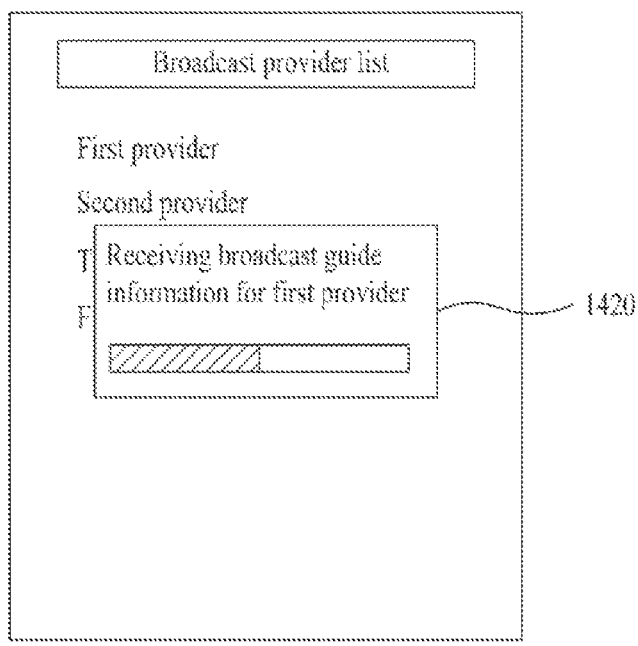

FIG. 14C
(a)
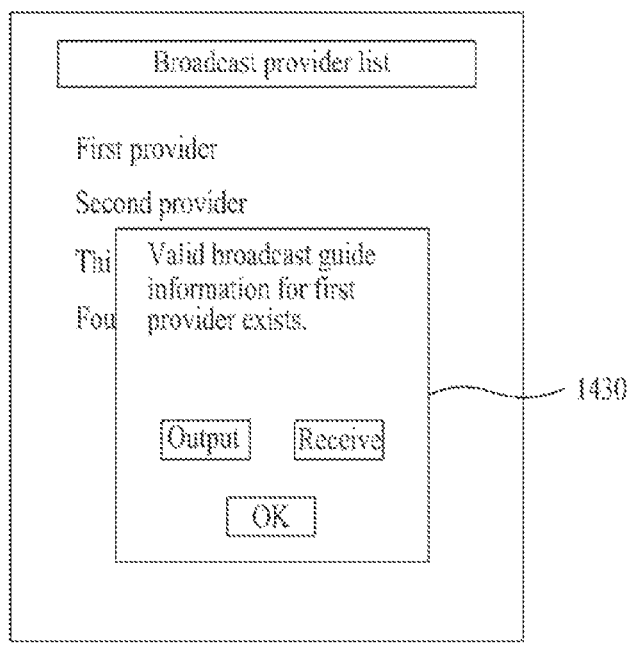
(b)
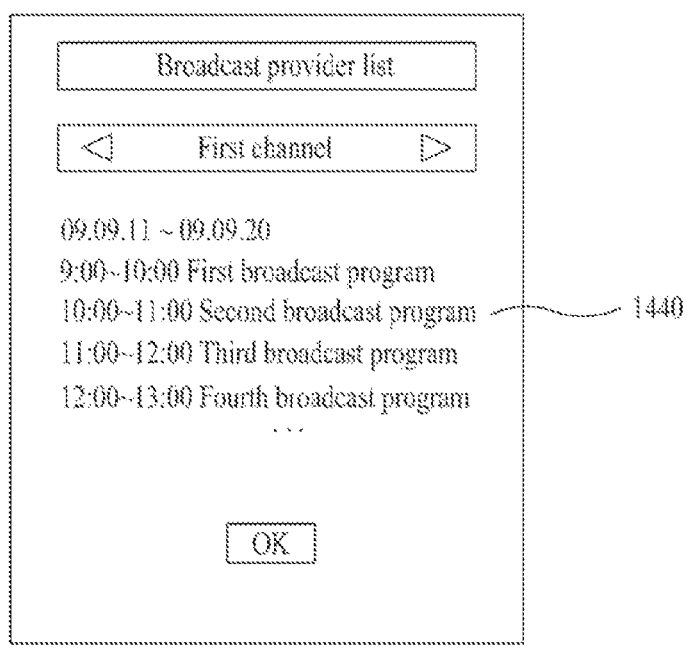

FIG. 15A
(a)
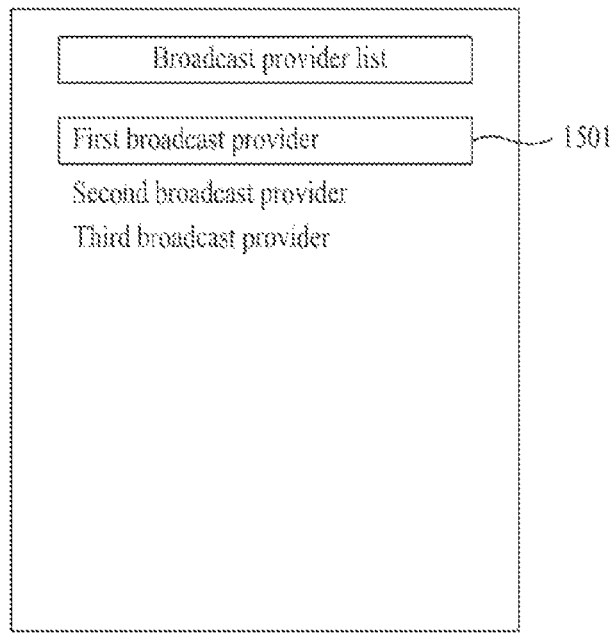
(b)
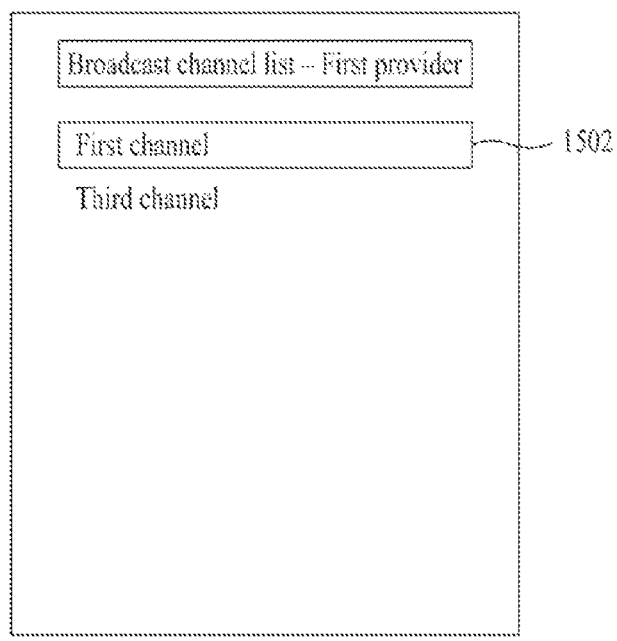

FIG. 15B
(a)
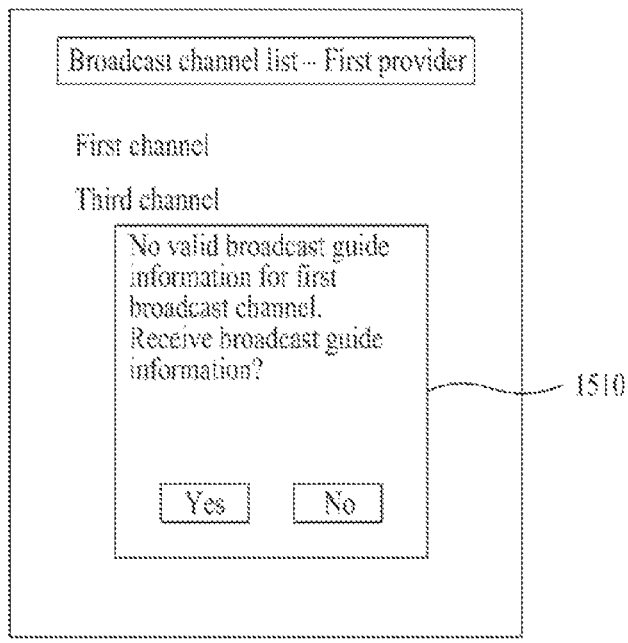
(b)
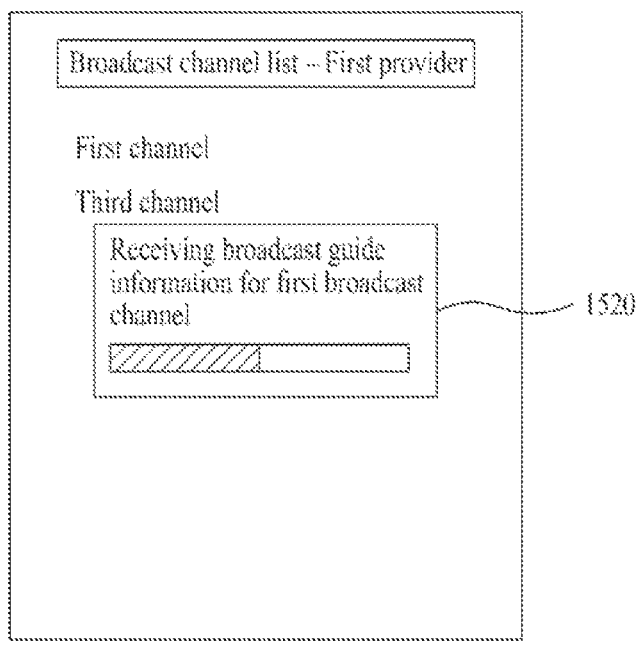

FIG. 15C
(a)
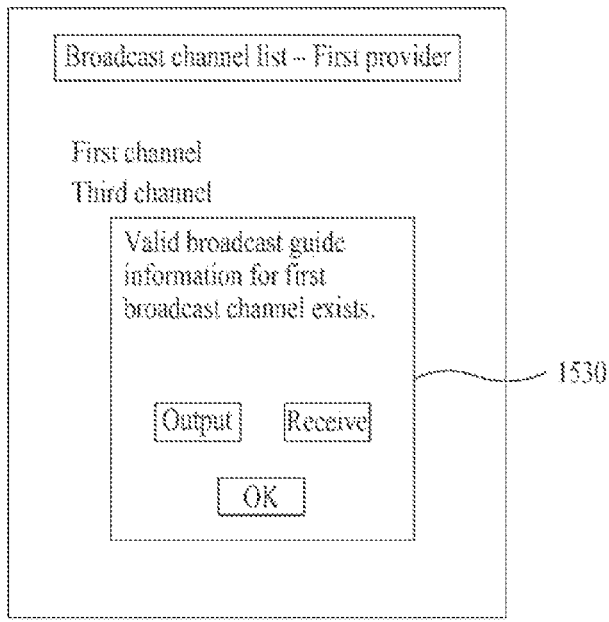
(b)
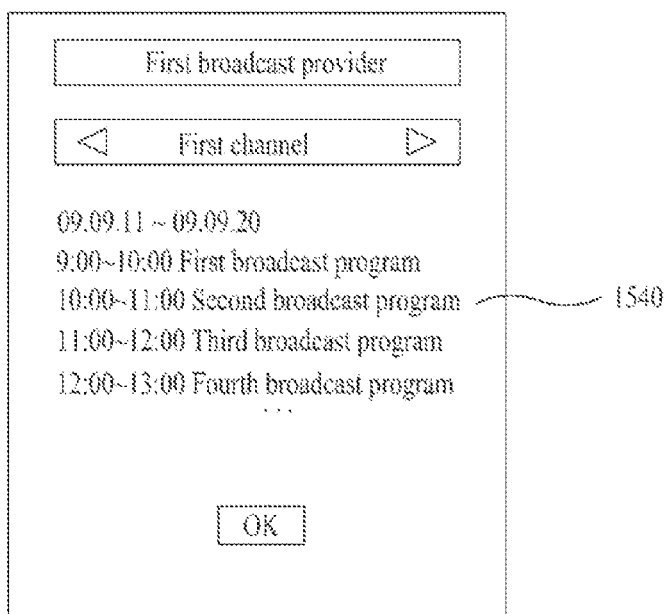

FIG. 15D
(a)
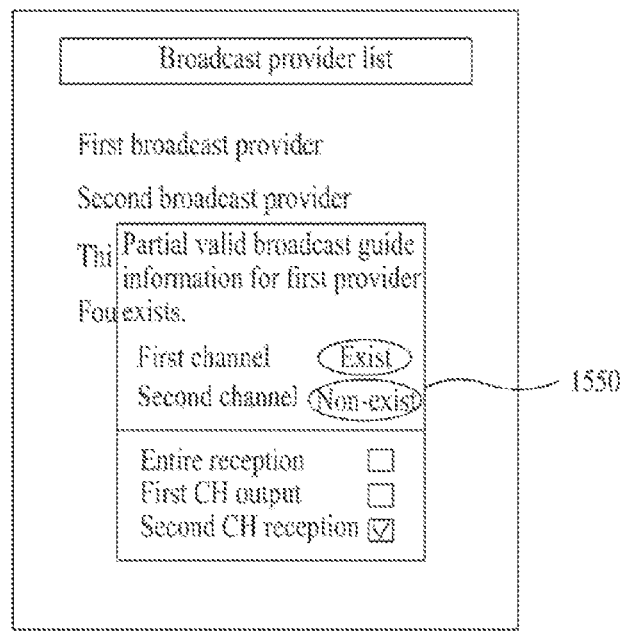
(b)
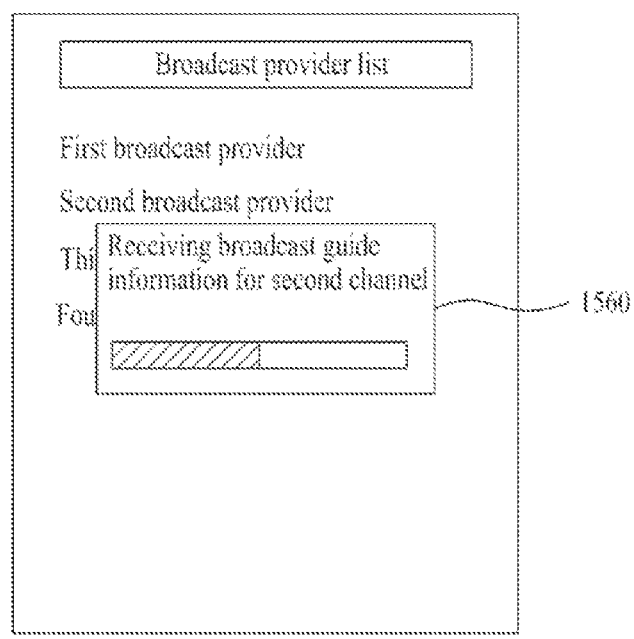

FIG. 16B
(a)
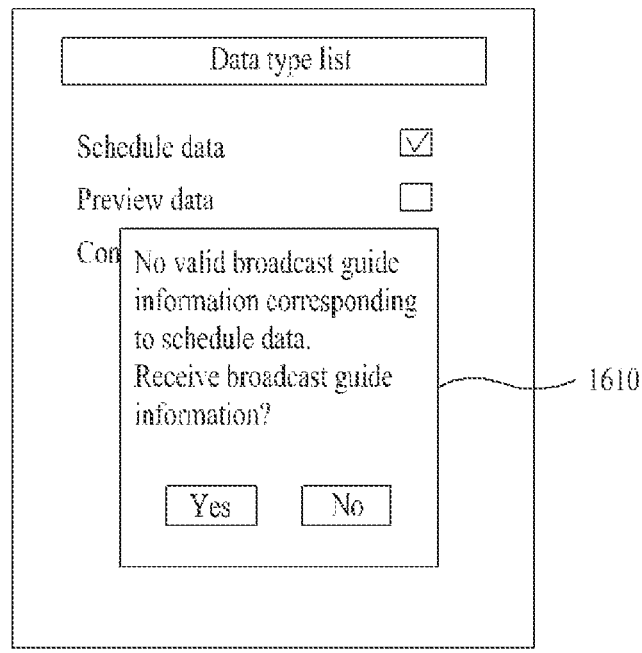
(b)
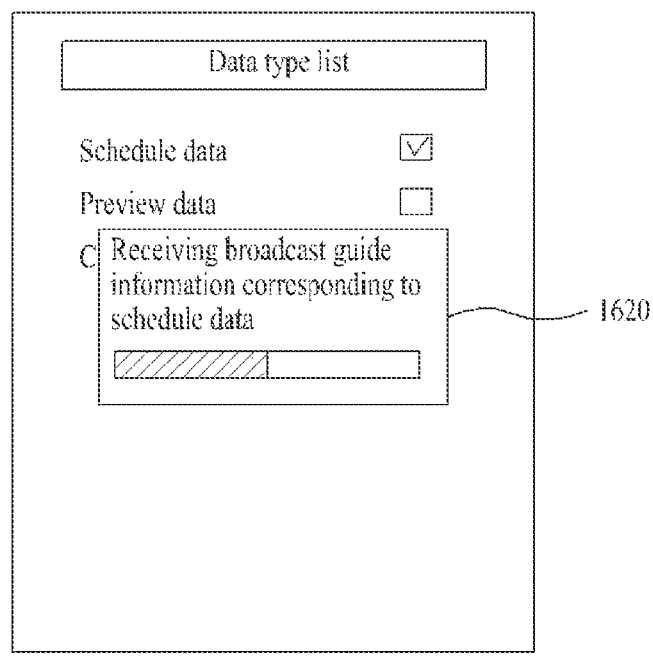

FIG. 16E
(a)
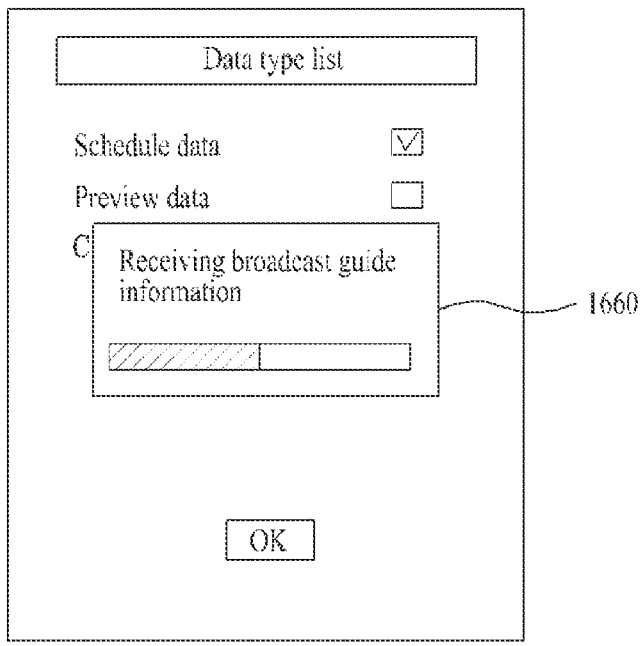
(b)
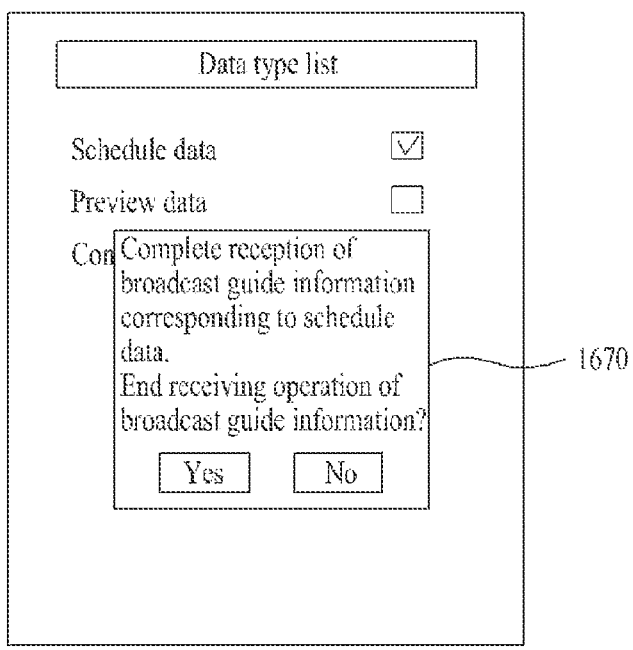

FIG. 17A
(a)
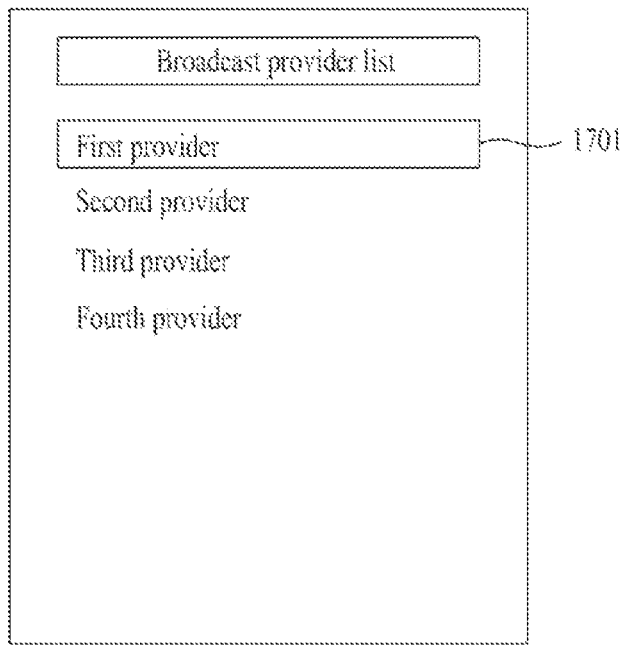
(b)
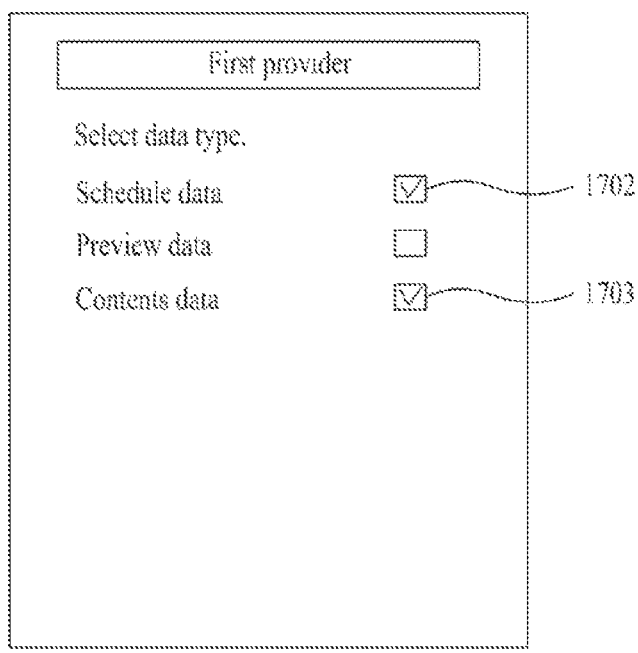

FIG. 17B
(a)
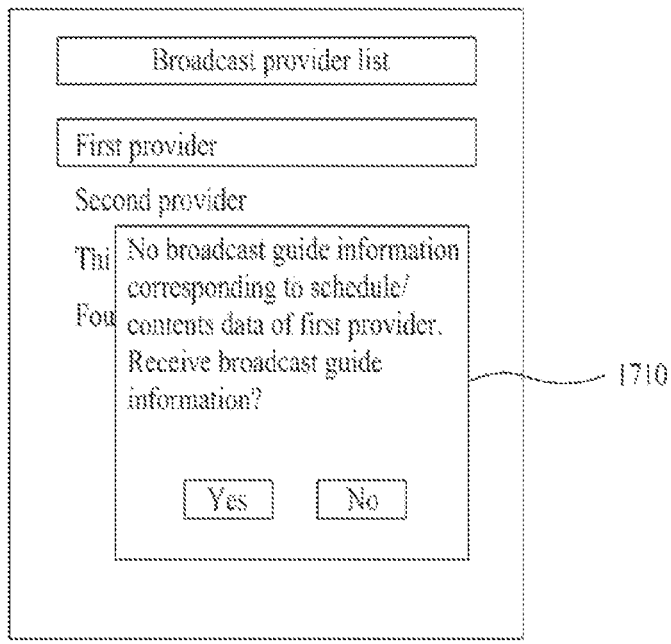
(b)
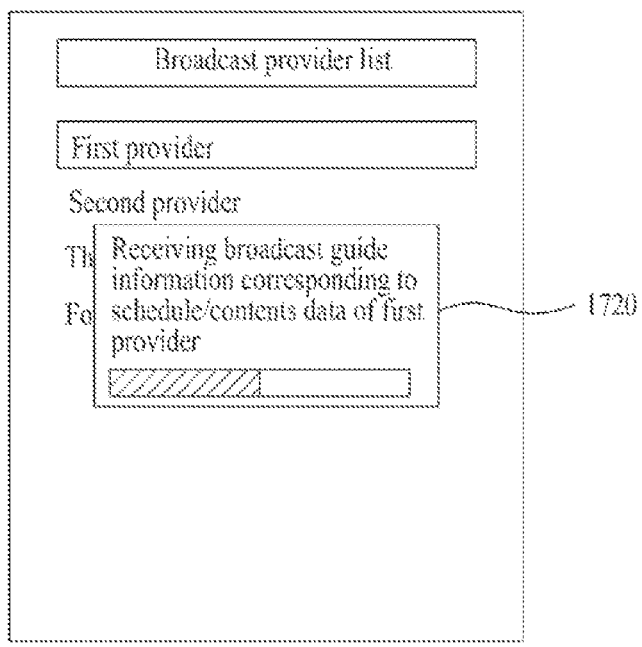

FIG. 17C
(a)
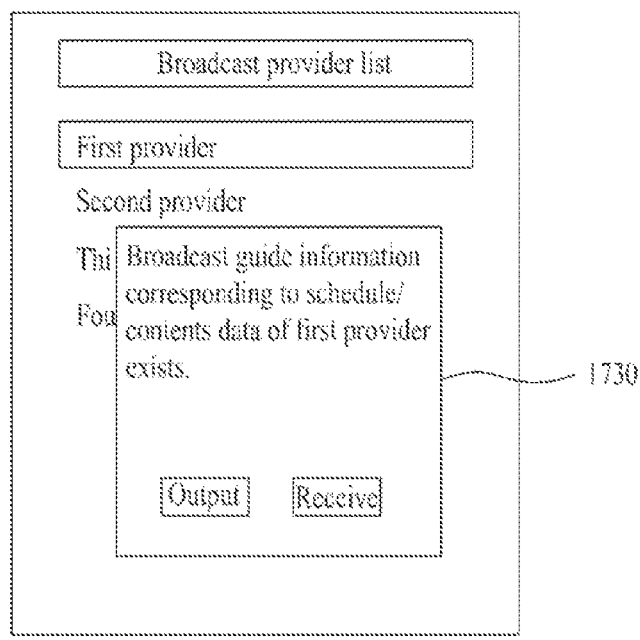
(b)
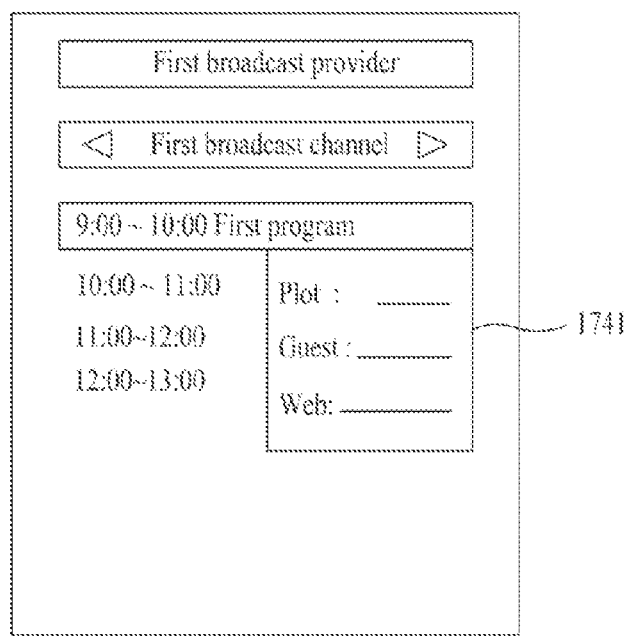

FIG. 17D
(a)
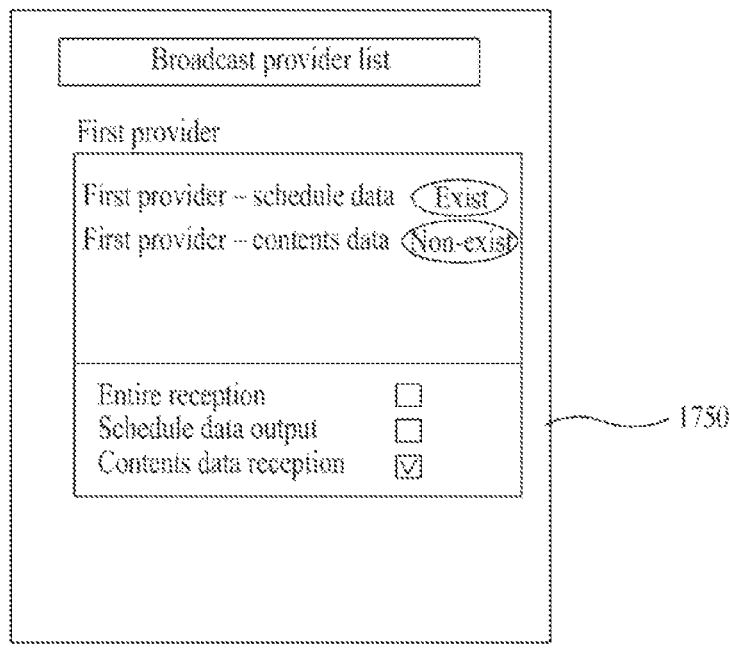
(b)
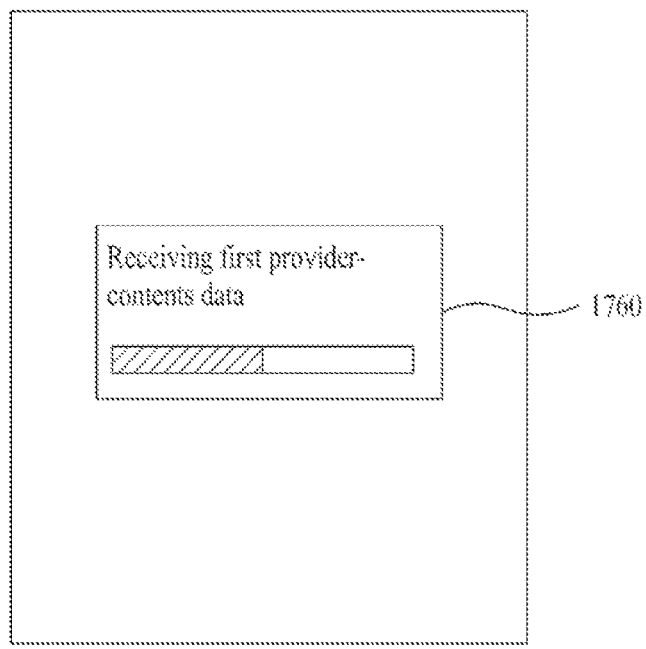

FIG. 17E
(a)
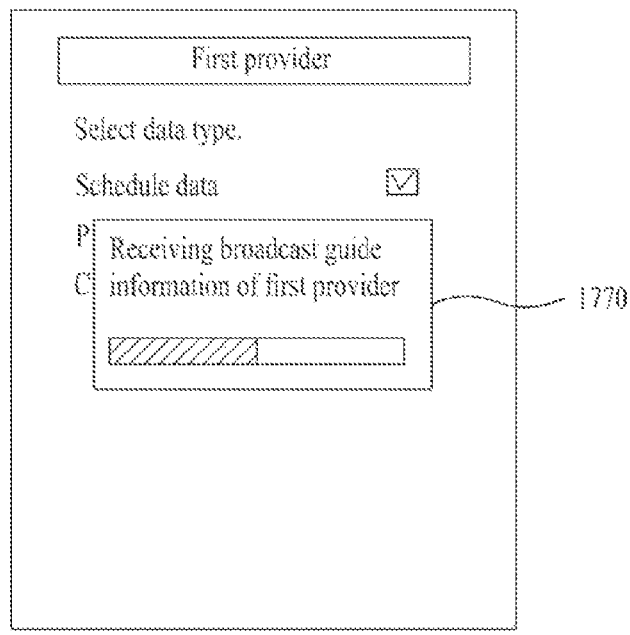
(b)
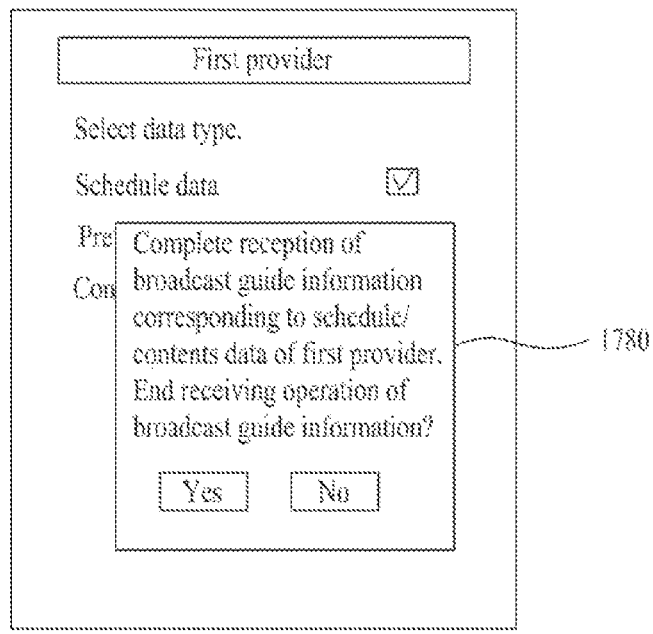

FIG. 18C
(a)
Previously stored broadcast guide information exists.
Identifying matching of broadcast guide information.
(b)
No matching of broadcast guide information.
Update broadcast guide information.

FIG. 19A
(a)
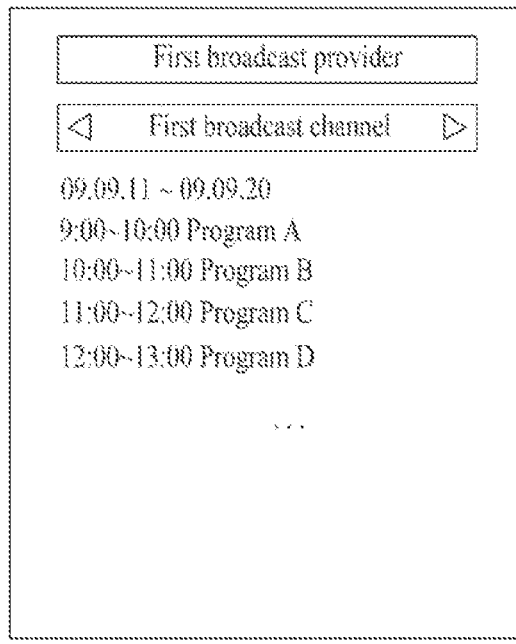
(b)
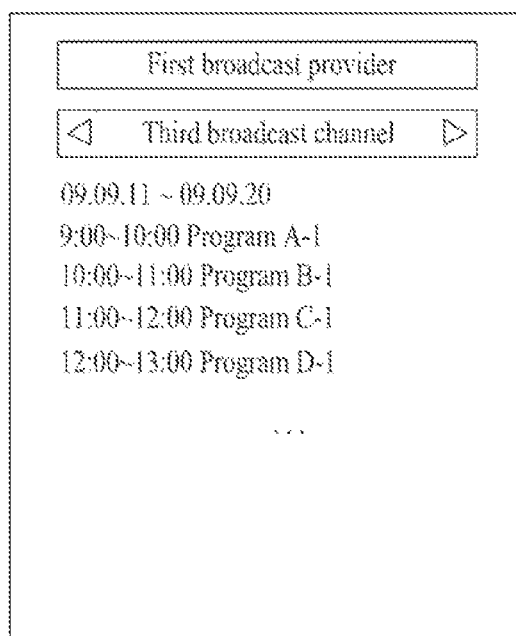

FIG. 19B
(a)
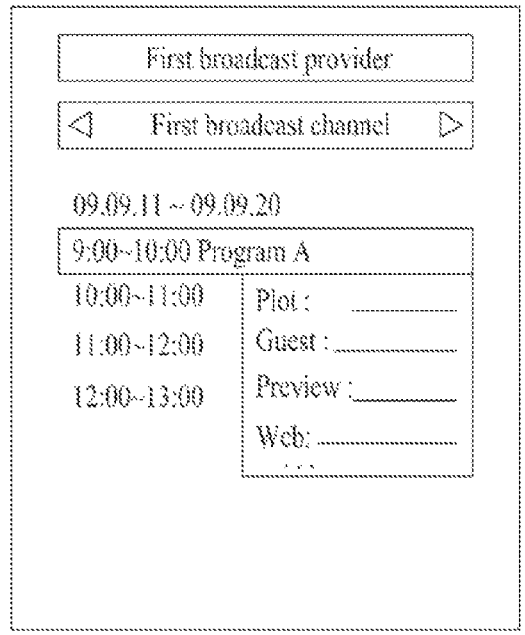
(b)
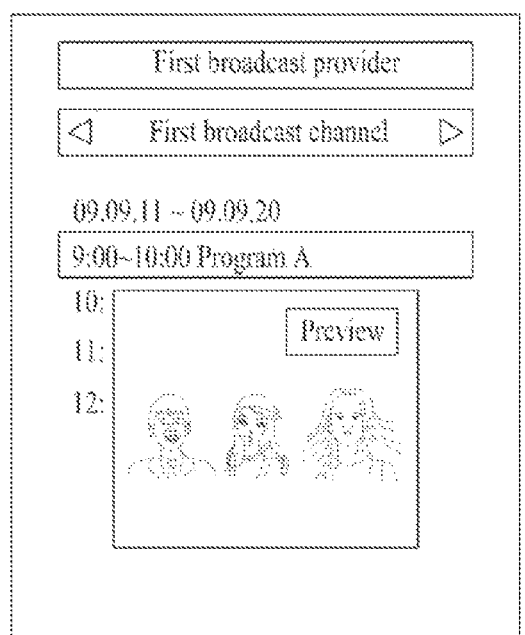

FIG. 20A
(a)
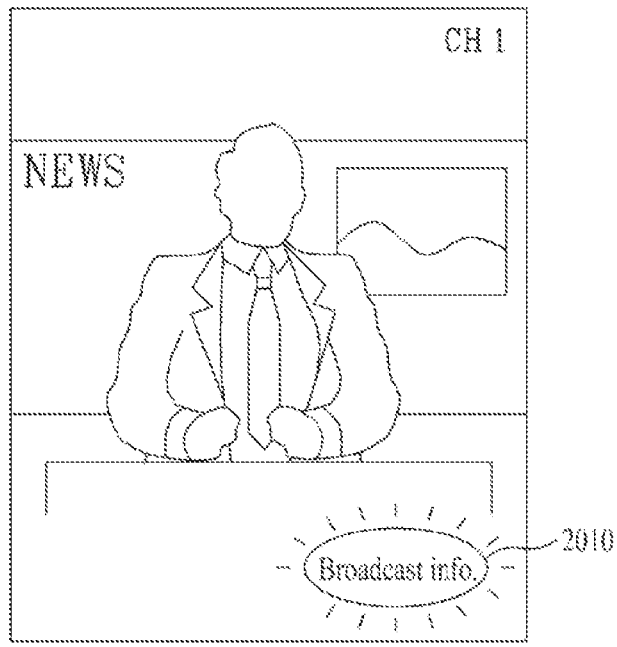
(b)
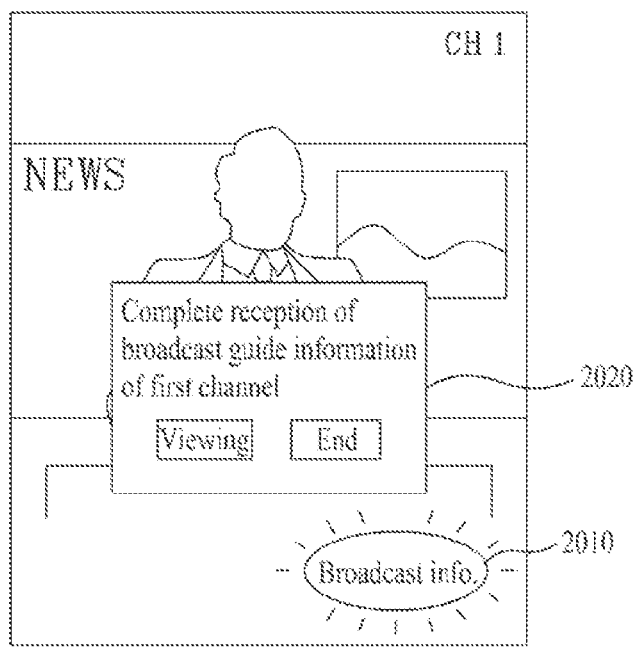

FIG. 20B
(a)
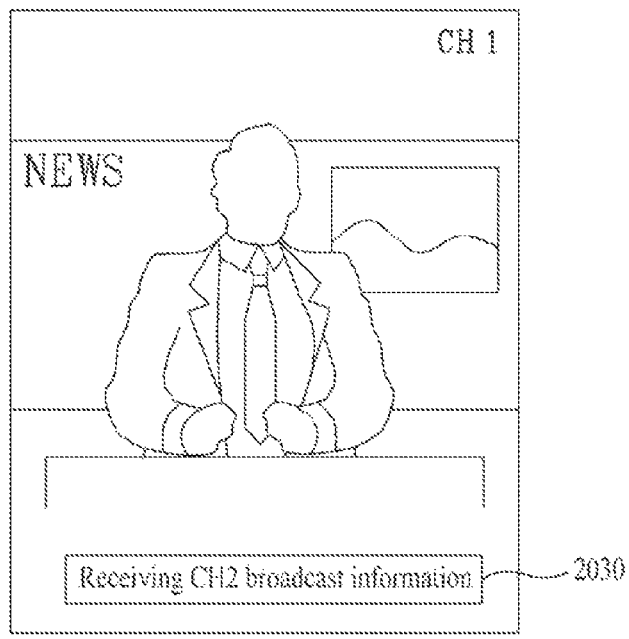
(b)
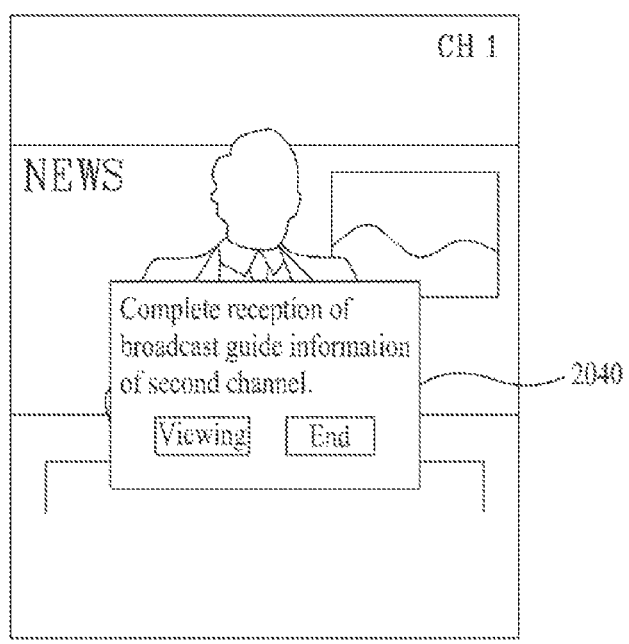

FIG. 21A

| Syntax | No. of Bits | Format |
|---|---|---|
| MH_SG bootstrap descriptor() { | | |
| descriptor_tag | 8 | 0xTBD |
| descriptor_length | 8 | uimsbf |
| reserved | 3 | '111' |
| SG_delivery_network_type | 5 | |
| SG_bootstrap_data(SG_delivery_network_type) | var | |
| } | | |

FIG. 21B

| SG_delivery_network_type | Meaning |
|---|---|
| 0x00 | Some SG fragments are delivered through the same M/H Broadcast where this GAT-MH is delivered |
| 0x01 | Some SG fragments are delivered through a different M/H Broadcast from the M/H Broadcast where this GAT-MH is delivered |
| 0x02 | Some SG fragments are delivered through a non-M/H IP-based broadcast channel |
| 0x03 | Some SG fragments are delivered through an IP-based interaction channel |

(a)

| Syntax | No. of Bits | Format |
|---|---|---|
| SG_bootstrap_data() { | | |
|     SG_entrypoint_URL_length | 8 | uimsbf |
|     SG_entrypoint_URL() | var | uimsbf |
| } | | |

(b)

US 8,331,982 B2

MOBILE TERMINAL AND METHOD FOR CONTROLLING BROADCAST IN MOBILE TERMINAL

This application claims the benefit of earlier filing date and right of priority to Korean Patent Application No. 10-2009-0107971, filed on Nov. 10, 2009, which is hereby incorporated by reference as if fully set forth herein.

BACKGROUND OF THE INVENTION

1. Field of the Invention

The present invention is directed to a mobile terminal and a method for controlling broadcast in a mobile terminal. The mobile terminal and method are specifically directed to a mobile terminal that can receive broadcast guide information only from one broadcast provider and the received broadcast guide information satisfies a specific condition.

2. Discussion of the Related Art

Generally, terminals can be classified into mobile/portable terminals and stationary terminals. The mobile terminals can be classified into handheld terminals and vehicle mount terminals according to the possibility of user's direct portability.

As functions of terminals are diversified, a terminal is implemented as a multimedia player provided with composite functions such as photographing of photos or moving pictures, playback of music or moving picture files, game play, and broadcast reception for example. To support and increase the terminal functions, the improvement of structural parts and/or software part of the terminal is considered.

Generally, a broadcast receiving terminal receives broadcast associated information from each of a plurality of broadcast providers as consolidated broadcast associated information when receiving broadcast contents from the plurality of broadcast providers. Accordingly, the broadcast receiving terminal cannot identify broadcast associated information of a desired broadcast provider until broadcast associated information of all of the plurality of broadcast providers is received.

However, much time is required to receive broadcast associated information from all of the plurality of broadcast providers. Also, a user cannot selectively receive a desired type of broadcast guide information or broadcast guide information from a desired broadcast provider.

SUMMARY OF THE INVENTION

In one aspect of the present invention, a mobile terminal is provided. The mobile terminal includes an output unit configured to display a broadcast provider list that includes at least one broadcast provider having corresponding broadcast guide information, a user input unit configured to receive a selection of a specific broadcast provider from the displayed broadcast provider list, a wireless communication unit configured to receive channel connection information for each of the at least one broadcast provider and a controller configured to extract channel connection information corresponding to the selected specific broadcast provider from the received channel connection information and to control the wireless communication unit to use the extracted channel connection information to receive broadcast guide receiving associated information and broadcast guide information corresponding to the selected specific broadcast provider.

It is contemplated that the channel connection information includes broadcast guide receiving associated information of each of the at least one broadcast provider. It is further contemplated that at least a consolidated broadcast frequency band common to the at least one broadcast provider or an individual broadcast frequency band designated for each of the at least one broadcast provider is assigned to the at least one broadcast provider.

It is contemplated that the user input unit is further configured to receive a selection of a specific broadcast channel from a plurality of broadcast channels managed by the selected specific broadcast provider and the controller is further configured to extract broadcast guide receiving associated information corresponding to the selected specific broadcast channel from the received broadcast guide receiving associated information and to control the wireless communication unit to use the extracted broadcast guide receiving associated information to receive broadcast guide information corresponding to the selected specific broadcast channel. It is further contemplated that the controller is further configured to determine whether valid broadcast guide information corresponding to the selected specific broadcast provider was previously stored and control the wireless communication unit to receive the broadcast guide information corresponding to the selected specific broadcast provider if valid broadcast guide information was not previously stored.

It is contemplated that the controller is further configured to determine whether valid broadcast guide information corresponding to the selected specific broadcast provider was previously stored by determining whether a duration of previously stored broadcast guide information corresponding to the selected specific broadcast provider has expired and determine whether the previously stored broadcast guide information is valid according to the comparison. It is further contemplated that the output unit is further configured to display a data type list that includes at least one data type corresponding to the received broadcast guide information corresponding to the selected specific broadcast provider, the user input unit is further configured to receive a selection of a specific data type from the displayed data type list, and the controller is further configured to control the output unit to display the data type list, to extract broadcast guide receiving associated information corresponding to the selected specific data type from the received broadcast guide receiving associated information and to control the wireless communication unit to use the extracted broadcast guide receiving associated information to receive broadcast guide information corresponding to the selected specific data type from the received broadcast guide information corresponding to the selected specific broadcast provider.

It is contemplated that the received broadcast guide receiving associated information includes channel connection information that provides broadcast guide information for each of the at least one data type. It is further contemplated that the controller is further configured to control the wireless communication unit to receive broadcast guide information for broadcast identification among the received broadcast guide information corresponding to the selected specific broadcast provider. Preferably, the mobile terminal further includes a memory unit configured to store the received broadcast guide information corresponding to the selected specific broadcast provider, wherein the controller is further configured to update broadcast guide information previously stored in the memory unit based on the received broadcast guide information if the previously stored broadcast guide information corresponds to the received broadcast guide information and store the received broadcast guide information in the memory unit if broadcast guide information that corresponds to the received broadcast guide information was not previously stored in the memory unit.

In another aspect of the present invention, a mobile terminal is provided. The mobile terminal includes a wireless communication unit configured to receive broadcast guide receiving associated information and broadcast guide information, an output unit configured to display a data type list that includes at least one data type corresponding to the received broadcast guide information, a user input unit configured to receive a selection of a specific data type from the displayed data type list and a controller configured to extract broadcast guide receiving associated information corresponding to the selected specific data type from the received broadcast guide receiving associated information and to control the wireless communication unit to use the extracted broadcast guide receiving associated information to receive broadcast guide information corresponding to the selected specific data type.

It is contemplated that the wireless communication unit is further configured to receive channel connection information for each of at least one broadcast provider and use the received channel connection information to receive the broadcast guide receiving associated information. It is further contemplated that the broadcast guide receiving associated information includes channel connection information that provides broadcast guide information for each of the at least one data type and the wireless communication unit is further configured to open a channel corresponding to the channel connection information and receive the broadcast guide information corresponding to the selected specific data type via the opened channel.

It is contemplated that the controller is further configured to determine whether valid broadcast guide information corresponding to the selected specific data type was previously stored and control the wireless communication unit to receive the broadcast guide information corresponding to the selected specific data type if valid broadcast guide information corresponding to the selected specific data type was not previously stored. It is further contemplated that the controller is further configured to extract broadcast guide receiving associated information for receiving broadcast guide information related to broadcast identification from the received broadcast guide receiving associated information and control the wireless communication unit to use the extracted broadcast guide receiving associated information to receive the broadcast guide information for broadcast identification.

It is contemplated that the controller is further configured to control the wireless communication unit to receive at least the broadcast guide receiving associated information or the broadcast guide information while receiving a broadcast signal from a specific broadcast channel. It is further contemplated that the controller is further configured to control the output unit to output the received broadcast guide information.

In another aspect of the present invention, a mobile terminal is provided. The mobile terminal includes a wireless communication unit configured to receive broadcast guide receiving associated information and broadcast guide information, an output unit configured to display a data type list that includes at least one data type corresponding to the received broadcast guide information, a user input unit configured to receive a selection of a specific data type from the displayed data type list and a controller configured to control the wireless communication unit to use the received broadcast guide receiving associated information to receive the broadcast guide information and stop receiving the broadcast guide information upon sensing reception of broadcast guide information corresponding to the selected data type.

In another aspect of the present invention, a method for controlling broadcast in a mobile terminal is provided. The method includes displaying a broadcast provider list that includes at least one broadcast provider having corresponding broadcast guide information, receiving a selection of a specific broadcast provider from the displayed broadcast provider list, receiving channel connection information for each of the at least one broadcast provider, extracting channel connection information corresponding to the selected specific broadcast provider from the received channel connection information and using the extracted channel connection information to receive broadcast guide receiving associated information and broadcast guide information corresponding to the selected specific broadcast provider. Preferably, the method further includes displaying a data type list that includes at least one data type corresponding to the received broadcast guide information and receiving a selection of a specific data type from the displayed data type list, where extracting the channel connection information includes extracting broadcast guide receiving associated information corresponding to the selected specific data type from the received broadcast guide receiving associated information and where receiving the broadcast guide information includes using the extracted broadcast guide receiving associated information to receive broadcast guide information corresponding to the selected specific data type from among broadcast guide information corresponding to the selected specific broadcast provider.

In another aspect of the present invention, a method for controlling broadcast in a mobile terminal is provided. The method includes displaying a data type list that includes at least one data type corresponding to broadcast guide information, receiving a selection of a specific data type from the displayed data type list, receiving broadcast guide receiving associated information, extracting broadcast guide receiving associated information corresponding to the selected specific data type from the received broadcast guide receiving associated information and using the extracted broadcast guide receiving associated information to receive broadcast guide information corresponding to the selected specific data type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A and FIG. 4B are diagrams illustrating structures of broadcast frequency band allocation of a plurality of broadcast providers in accordance with one embodiment of the present invention.

FIG. 5 is a diagram illustrating a structure of ensemble provided by a mobile zone of a broadcast frequency band of a specific broadcast provider in accordance with one embodiment of the present invention.

FIG. 6 is a structural view illustrating SGDD and SGDU according to one embodiment of the present invention.

FIG. 7A and FIG. 7B are structural views illustrating GAT and SMT according to one embodiment of the present invention.

FIG. 8 is a structural view of SGDD according to one embodiment of the present invention.

FIG. 9 is a structural view of SGDU according to one embodiment of the present invention.

FIG. 10 to FIG. 12 are flow charts of a method for controlling broadcast in a mobile terminal according to the present invention.

FIG. 13A to FIG. 13E are schematic views illustrating a screen that displays a broadcast provider list in accordance with the present invention.

FIG. 14A to FIG. 14C are schematic views of a screen illustrating a process for receiving broadcast guide information from a specific broadcast provider in accordance with the present invention.

FIG. 15A to FIG. 15D are schematic views of a screen illustrating a process for receiving broadcast guide information from a specific broadcast channel of a specific broadcast provider in accordance with the present invention.

FIG. 16A to FIG. 16E are schematic views of a screen illustrating a process for receiving broadcast guide information corresponding to a specific data type in accordance with the present invention.

FIG. 17A to FIG. 17E are schematic views of a screen illustrating a process for receiving broadcast guide information corresponding to a specific data type and a specific broadcast provider in accordance with the present invention.

FIG. 18A to FIG. 18C are schematic views of a screen illustrating a process for storing broadcast guide information in accordance with the present invention.

FIG. 19A and FIG. 19B are schematic views of a screen illustrating a process for outputting broadcast guide information in accordance with the present invention.

FIG. 20A and FIG. 20B are schematic views of a screen illustrating a process for receiving broadcast associated information while receiving/outputting a broadcast signal in accordance with the present invention.

FIG. 21A and FIG. 21B are structural views of data including network access information for receiving broadcast associated information via data communication in accordance with the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention is applicable to a various types of terminals. Examples of such terminals include mobile as well as stationary terminals, such as mobile phones, user equipment, smart phones, DTV, computers, digital broadcast terminals, personal digital assistants (PDA), portable multimedia players (PMP) and navigators. By-way of non-limiting example only, further description will be with regard to a mobile terminal, but it should be noted that such teachings may apply equally to other types of terminals. Except for a case applicable only to a mobile terminal, it is apparent to those skilled in the art that the configurations according to an embodiment described in this disclosure are applicable to a stationary terminal such as a digital TV, and a desktop computer among others.

Figure 1:
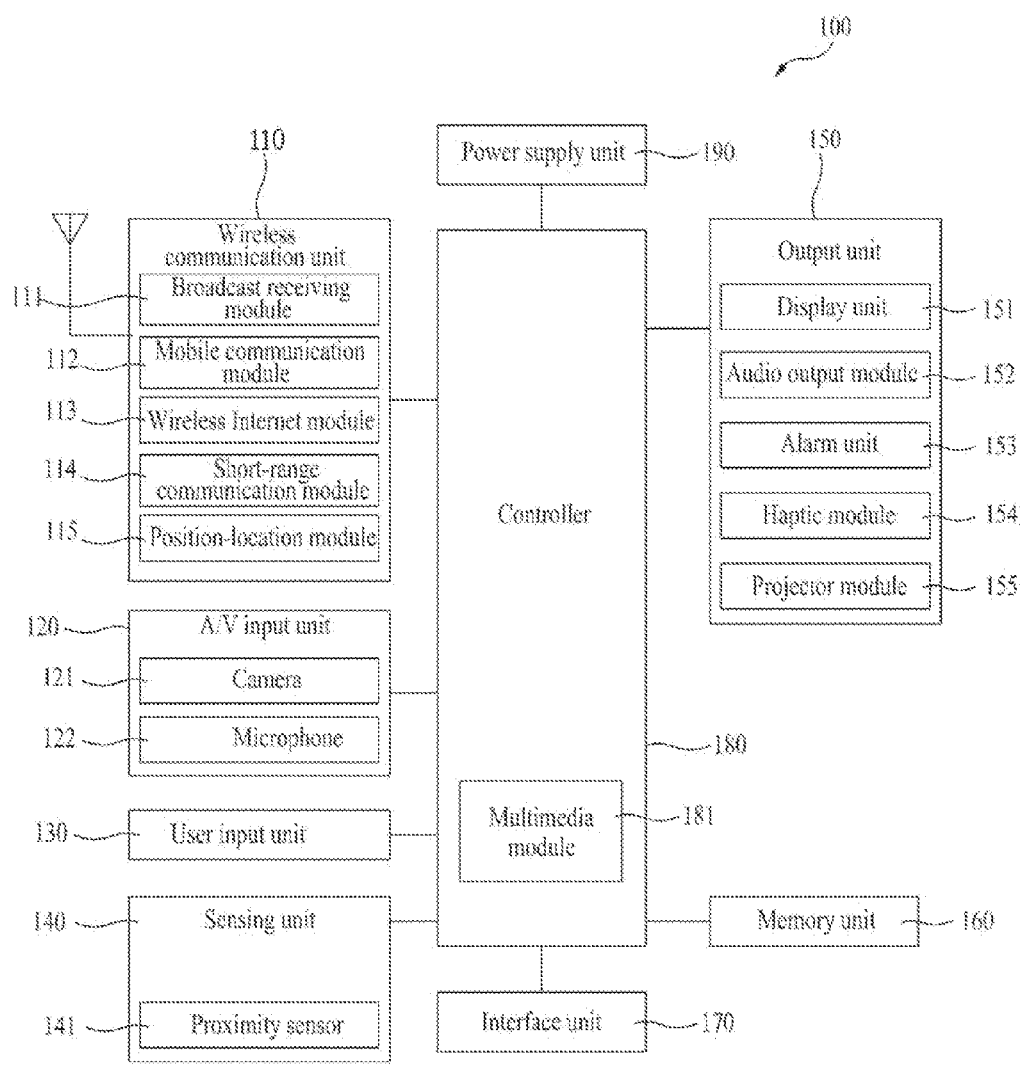
FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory unit 160, an interface unit 170, a controller 180, and a power supply unit 190. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

The wireless communication unit 110 can include a broadcast receiving module 111, a mobile communication module 112, a wireless Internet module 113, a short-range communication module 114, and a position-location module 115. At least two broadcast receiving modules 111 can be provided to facilitate simultaneous reception of at least two broadcast channels or broadcast channel switching.

The broadcast receiving module 111 receives a broadcast signal and/or broadcast associated information from an external broadcast managing server via a broadcast channel. The broadcast channel may include a satellite channel or a terrestrial channel.

The broadcast managing server refers generally to a system that transmits a broadcast signal and/or broadcast associated information or a server which is provided with a previously generated broadcast signal and/or broadcast associated information. The broadcast messaging server then transmits the provided signal or information to a terminal.

Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T).

Receiving multicast signals is also possible. Data received by the broadcast receiving module 111 may be stored in a suitable device, such as the memory unit 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. The wireless Internet technology can include, for example, WLAN (Wireless LAN) (Wi-Fi), Wibro (Wireless broadband), Wimax (World Interoperability for Microwave Access), or HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using a global positioning system (GPS) module.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on the display unit 151. The image frames processed by the camera 121 can be stored in the memory unit 160 or can be externally transmitted via the wireless communication unit 110.

The microphone 122 receives an external audio signal while the mobile terminal 100 is in a particular mode, such as phone call mode, recording mode or voice recognition mode. This audio signal is processed and converted into digital data. The processed audio data is transformed into a format transmittable to a mobile communication base station via the mobile communication module 112 in a call mode. The microphone 122 typically includes assorted noise removing algorithms to remove noise generated in the course of receiving the external audio signal.

Data generated by the A/V input unit 120 may be stored in the memory unit 160, utilized by the output unit 150, or transmitted via one or more modules of the wireless communication unit 110. If desired, two or more cameras 121 or microphones 122 may be provided.

The user input unit 130 generates input data responsive to user manipulation of an associated input device or devices. Examples of such devices include a keypad, a dome switch, a touchpad such as static pressure/capacitance, a jog wheel and a jog switch.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or orientation or acceleration/deceleration of the mobile terminal. The sensing unit 140 can include a proximity sensor 141.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply unit 190 or the presence or absence of a coupling or other connection between the interface unit 170 and an external device.

The output unit 150 generates outputs relevant to the senses such as sight, hearing, and touch. The output unit 150 is illustrated in FIG. 1 as having a display unit 151, an audio output module 152, an alarm unit 153, a haptic module 154, and a projector module 155.

The display unit 151 is typically implemented to visually display (output) information associated with the mobile terminal 100. For example, if the mobile terminal 100 is operating in a phone call mode, the display unit 151 will generally provide a user interface (UI) or graphical user interface (GUI) that includes information associated with placing, conducting, and terminating a phone call. If the mobile terminal 100 is in a video call mode or a photographing mode, the display unit 151 may additionally or alternatively display images which are associated with these modes, the UI or the GUI.

One particular implementation of the present invention includes the display unit 151 configured as a touch screen working in cooperation with an input device, such as a touchpad. This configuration permits the display unit 151 to function both as an output device and an input device.

The display unit 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more display unit 151.

Some of the display units 151 can be implemented as a transparent or optical transmittive type, which can be called a transparent display. The transparent display may be a TOLED (transparent OLED). A rear configuration of the display 151 unit can be implemented as an optical transmittive type as well. In this configuration, a user is able to see an object at the rear of the terminal body via the area occupied by the display unit 151.

At least two display units 151 can be provided in accordance with the implemented configuration of the mobile terminal 100. For example, a plurality of display units 151 can be arranged on a single face of the mobile terminal 100 such that they are spaced apart from each other or built in one body. Alternatively, a plurality of display units 151 can be arranged on different faces of the mobile terminal 100.

If the display unit 151 and a sensor for detecting a touch action (hereinafter called 'touch sensor') form a mutual layer structure such as a touch screen, the touch sensor can be configured as a touch film, a touch sheet, or a touchpad. The touch sensor can be configured to convert a pressure applied to a specific portion of the display unit 151 or a variation of a capacitance generated from a specific portion of the display unit into an electric input signal. Furthermore, the touch sensor may be configured to detect a pressure of a touch as well as a touched position or size.

If a touch input is made to the touch sensor, signal(s) corresponding to the touch are transferred to a touch controller (not shown). The touch controller processes the signal(s) and then transfers the processed signal(s) to the controller 180. The controller 180 is able to determine whether a specific portion of the display unit 151 is touched.

The proximity sensor 141 can be provided at an internal area of the mobile terminal 100 enclosed by the touch screen or around the touch screen. The proximity sensor 141 is a sensor that detects a presence or non-presence of an object approaching a specific detecting surface or an object existing around the proximity sensor using an electromagnetic field strength or infrared ray without mechanical contact. Therefore, the proximity sensor 141 is more durable than a contact type sensor and also provides wider utility than a contact type sensor.

The proximity sensor 141 may include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor or similar sensors. If the touch screen includes an electrostatic capacity proximity sensor, it is configured to detect the proximity of a pointer using a variation of electric field according to the proximity of the pointer. In this case, the touch screen (touch sensor) can be classified as the proximity sensor 141.

In the following description, an action where a pointer that approaches without contacting the touch screen is recognized as located on the touch screen is called a 'proximity touch'. Furthermore, an action where a pointer actually touches the touch screen is called a 'contact touch'. The meaning of a position on the touch screen proximity-touched by the pointer is a position of the pointer that vertically opposes the touch screen when the pointer performs the proximity touch.

The proximity sensor 141 detects a proximity touch and a proximity touch pattern (e.g., a proximity touch distance, a proximity touch duration, a proximity touch position, or a proximity touch shift state). Information corresponding to the detected proximity touch and the detected proximity touch pattern can be output to the touch screen.

The audio output module 152 supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The alarm unit 153 may signal or otherwise identify the occurrence of a particular event associated with the mobile terminal 100. Typical events include call received, message received and user input received.

The alarm unit 153 outputs a signal for announcing the event occurrence via vibration as well as via video or audio signal. The video or audio signal can be output via the display unit 151 or the audio output unit 152. Therefore, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For example, different vibrations may be output by being synthesized together or may be output in sequence.

The haptic module 154 is able to generate various tactile effects as well as vibration. For example, the haptic module 154 may generate the effect of an arrangement of pins vertically moving against a contact skin surface, the effect of an injection/suction power of air though an injection/suction hole, the effect of skimming over a skin surface, the effect of contact with an electrode, the effect of electrostatic force, or the effect of hot/cold using an endothermic or exothermic device.

The haptic module 154 can be implemented to enable a user to sense the tactile effect through a muscle sense of a finger, an arm or other body part as well as to transfer the tactile effect through a direct contact. At least two haptic modules 154 can be provided in the mobile terminal 100 in accordance with the corresponding configuration of the mobile terminal.

The projector module 155 is an element for performing an image projector function using the mobile terminal 100. The projector module 155 may display an image, which is identical to or partially different from the image displayed on the display unit 151, on an external screen or wall according to a control signal from the controller 180.

The projector module 155 may include a light source (not shown) such as a laser for projecting an image externally, an image producing means (not shown) for producing an image to output externally using the light generated from the light source, and a lens (not shown) for enlarging the externally output image in a predetermined focus distance. The projector module 155 can further include a device (not shown) for adjusting an image projected direction by mechanically moving the lens or the entire projector module.

The projector module 155 can be classified as a CRT (cathode ray tube) module, an LCD (liquid crystal display) module, or a DLP (digital light processing) module according to a type of display means. Specifically, the DLP module is operated by enabling the light generated from the light source to reflect on a DMD (digital micro-mirror device) chip and can be advantageous for limiting the size of the projector module 155.

Preferably, the projector module 155 is provided in a lengthwise direction of a lateral, front or backside direction of the mobile terminal 100. However, it is understood that the projector module 155 may be provided on any portion of the mobile terminal 100.

The memory unit 160 is generally used to store various types of data to support the processing, control, and storage requirements of the mobile terminal 100. Examples of such data include program instructions for applications operating in the mobile terminal 100, contact data, phonebook data, messages, pictures, and video.

A recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory unit 160 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, multimedia card micro type memory, card-type memory (e.g., SD memory, XD memory), and other similar memory or data storage devices. The mobile terminal 100 may operate in association with web storage for performing a storage function of the memory unit 160 on the Internet.

The interface unit 170 is often implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, or an earphone port.

The identity module is a chip for storing various kinds of information for authenticating a user's authority to use the mobile terminal 100 and can include a User Identify Module (UIM), a Subscriber Identity Module (SIM), or a Universal Subscriber Identity Module (USIM). A device having the identity module (hereinafter called 'identity device') can be manufactured as a smart card. Therefore, the identity device is connectible to the mobile terminal 100 via a corresponding port.

When the mobile terminal 110 is connected to an external cradle, the interface unit 170 provides a passage for supplying the mobile terminal 100 with power from the cradle or a passage for delivering various command signals to the mobile terminal 100 that are input from the cradle by a user. Each of the various command signals input from the cradle or the power can operate as a signal enabling the mobile terminal 100 to determine that it is correctly loaded in the cradle.

The controller 180 typically controls the overall operations of the mobile terminal 100. For example, the controller 180 performs the control and processing associated with voice calls, data communications, instant message communication, video calls, camera operations and recording operations. Furthermore, the controller 180 may perform a pattern recognizing process for recognizing a writing input and a picture drawing input performed on the touch screen as characters or images.

The controller 180 may include a multimedia module 181 that provides multimedia playback. The multimedia module 181 may be configured as part of the controller 180 or implemented as a separate component.

The power supply unit 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination of these devices. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory unit 160, and executed by a controller or processor, such as the controller 180.

Figure 2:
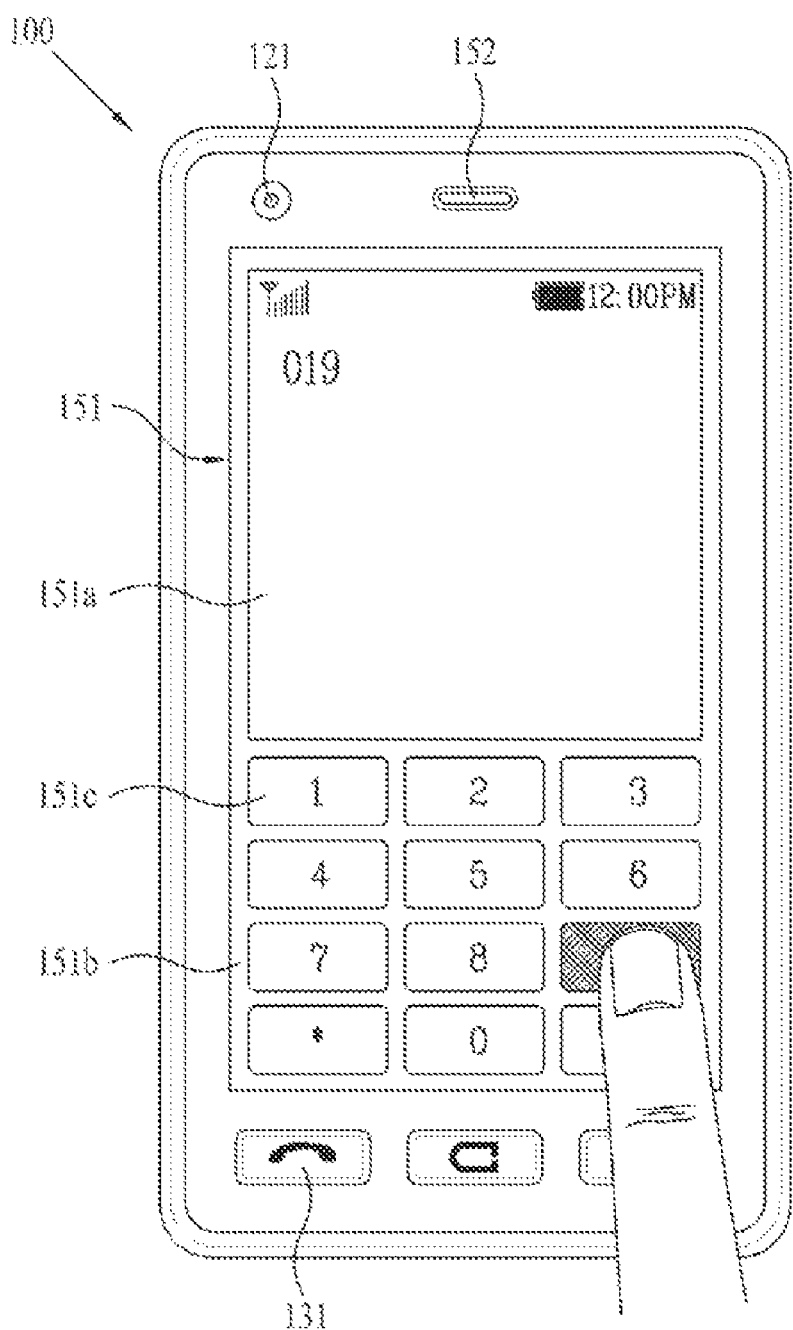
FIG. 2 is a front diagram of a mobile terminal according to one embodiment of the present invention for explaining one operational status of the mobile terminal.

An interconnected operational mechanism between the display unit 151 and a touchpad (not shown) is explained with reference to FIG. 2. FIG. 2 is front-view diagram for explaining an operational state of a terminal according to one embodiment of the present invention.

Various kinds of visual information can be displayed on the display unit 151. This information can be displayed as characters, numerals, symbols, graphics, or icons.

In order to input the information, at least one of the characters, numerals, symbols, graphics and icons are represented as a single predetermined array to be implemented in a keypad formation. This keypad formation can be called 'soft keys'.

FIG. 2 shows that a touch applied to a soft key is input via a front face of a terminal body. The display unit 151 is operable through an entire area or by being divided into a plurality of regions. In the latter case, a plurality of the regions can be configured as interoperable.

An output window 151a and an input window 151b are displayed on the display unit 151. A soft key 151c representing a digit for inputting, for example, a phone number is touched on the input window 151b. When the soft key 151c is touched, a digit corresponding to the touched soft key is displayed in the output window 151a. If a first manipulating unit 131 is manipulated, a call connection for the phone number displayed in the output window 151a is attempted.

Figure 3A:
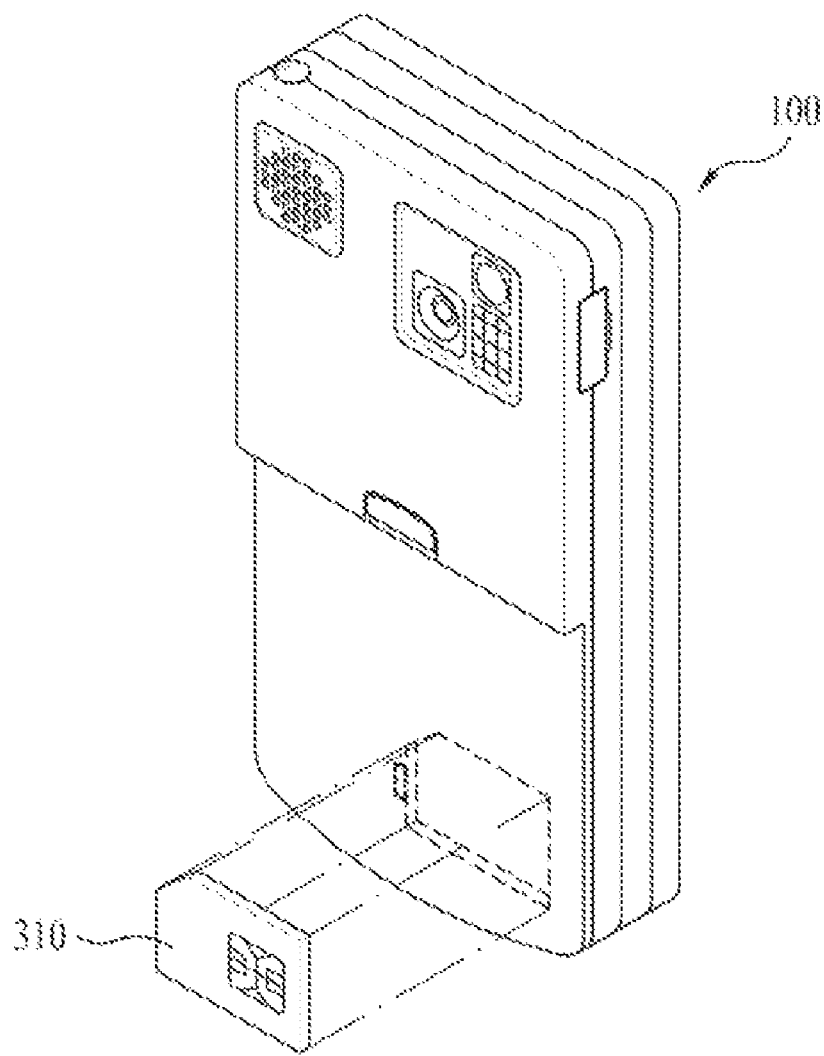
FIG. 3A and FIG. 3B are perspective diagrams of a mobile terminal according to one embodiment of the present invention.
Figure 3B:
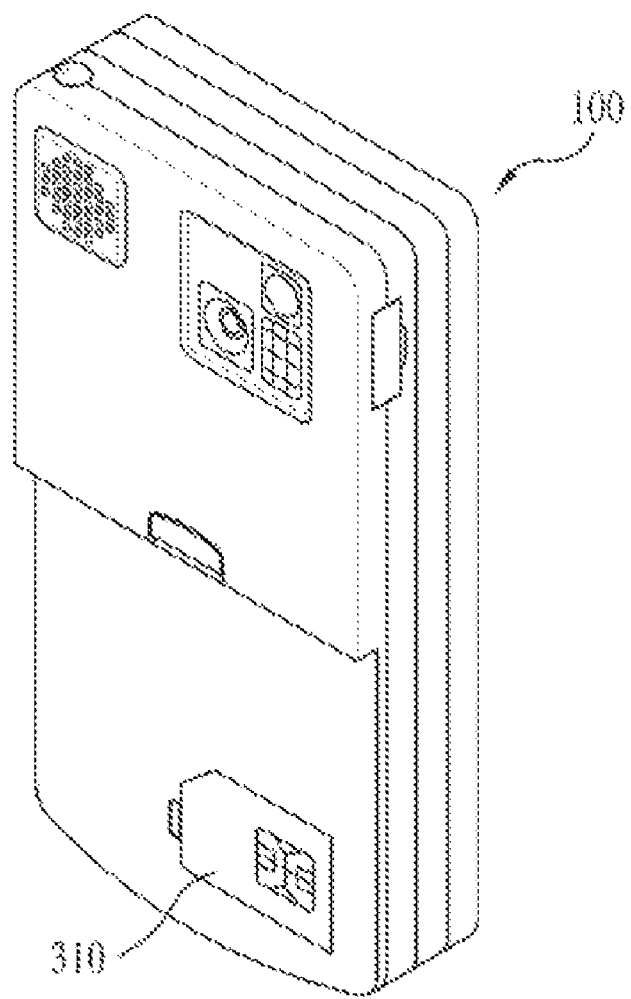

FIG. 3A and FIG. 3B illustrate an identity module 310 detached from a mobile terminal 100 according to one embodiment of the present invention. For example, the identity module includes a SIM card.

As shown in FIG. 3A and FIG. 3B, the identity module 310 is provided as detachable from the mobile terminal 100. The identity module 310 may be combined with the interface unit 170 and then mounted in the mobile terminal 100. Alternatively, the identity module 310 may be connected with a connector separately provided for combination with the identity module 310 and then mounted in the mobile terminal 100.

The mobile terminal 100 may authenticate all the powers of the mobile terminal 100 using the identity module 310 or may authenticate a broadcasting viewing/buying power using the identity module. Although not shown, a connecting means for connecting the identity module 310 to the mobile terminal 100 may be provided at a rear side, a lateral side, or a front side of the mobile terminal 100.

Although FIG. 3A and FIG. 3B illustrate the identity module 310 as detached from the mobile terminal 100, it will be apparent that the present invention can be applied to a mobile terminal not having a detachable identity module.

The term broadcast provider as used herein may mean either a broadcast business provider that provides broadcast contents through at least one broadcast channel or a broadcast channel. For example, if the broadcast business provider manages first to third broadcast channels, the broadcast provider could be the broadcast business provider (for example, MBN) or each of the first to third broadcast channels (for example, CH MBN-News, CH MBN-Drama, CH MBN-Sports).

According to advanced television systems committee-mobile/handheld (ATSC-M/H), the broadcast business provider may be referred to as a provider and the broadcast channel may be referred to as a service. Furthermore, the term 'ensemble' as used herein is a congregation of at least one broadcast channel (or service) provided by at least one broadcast provider and can include a table with configuration information of each of a plurality of broadcast channels included in the corresponding ensemble. The ensemble will be described in detail with reference to FIG. 5.

The 'channel connection information', the 'broadcast guide receiving associated information', and the 'broadcast guide information' as used herein may be referred to as the 'broadcast associated information' and will be described later with reference to FIG. 6 to FIG. 9. For example, in the ATSC-M/H, the 'channel connection information' may be referred to as a guide access table (GAT) and a service map table (SMT), the 'broadcast guide receiving associated information' may be referred to as a service guide delivery descriptor (SGDD), and the 'broadcast guide information' may be referred to as a service guide delivery unit (SGDU).

Broadcast frequency band allocation and a structure of ensemble provided by a mobile zone will be described in detail with reference to FIG. 4A to FIG. 5. For convenience of description, it is supposed that a plurality of broadcast providers provide broadcast contents and broadcast associated information to the mobile terminal 100.

The broadcast frequency band can be classified into a broadcast frequency band (hereinafter, referred to as a ground wave band) for ground wave broadcasting targeted to a general fixed type TV and a broadcast frequency band (hereinafter, referred to as a mobile zone) for mobile broadcasting targeted to a mobile TV. It is assumed that one broadcast provider can provide both ground wave broadcasting and mobile broadcasting.

FIG. 4A and FIG. 4B are diagrams illustrating a broadcast frequency band allocation structure of a plurality of broadcast providers in accordance with one embodiment of the present invention. Referring to FIG. 4A, the broadcast frequency band is classified into a ground wave zone 410 and a mobile zone 420. Since the mobile zone 420 is a consolidated frequency band common to all broadcast providers (first broadcast provider to fourth broadcast provider), it is not separately allocated to each of the broadcast providers. This means that the mobile zone 420 is shared by all the broadcast providers.

Referring to FIG. 4A(a), the mobile zone 420 is classified into a broadcast contents zone 421 and a broadcast associated information zone 422. Referring to FIG. 4A(b), the broadcast contents zone and the broadcast associated information zone can be managed together by the mobile zone 420. As illustrated, in FIG. 4A(a), all the broadcast providers can provide a broadcast signal of a specific broadcast channel through the broadcast contents zone 421 and can provide the broadcast associated information to the broadcast providers separately or together through the broadcast associated information zone 422.

The broadcast contents zone 421 may mean a broadcast frequency band for receiving a broadcast signal corresponding to a broadcast program provided by the broadcast provider through a broadcast channel. The broadcast associated information zone 422 may mean a broadcast frequency band for receiving broadcast associated information provided by the broadcast provider.

Referring to FIG. 4B, the broadcast frequency band may be allocated separately to each of the first broadcast provider or the fourth broadcast provider, which are all the broadcast providers, or may be allocated separately to each of the broadcast channels (430, 440, 450, 460). Referring to FIG. 4B(a), the broadcast frequency band is allocated to each of broadcast channels managed by the broadcast provider. Referring to FIG. 4B(b), the broadcast frequency band is allocated to each of the broadcast providers.

For example, it is assumed that the first broadcast provider manages the first and third broadcast channels. As illustrated in FIG. 4B(a), each broadcast frequency band is allocated to the first broadcast provider (first broadcast channel 430) and the first broadcast provider (third broadcast channel 450) and in FIG. 4B(b) the broadcast frequency band is allocated to the first broadcast provider (first and third broadcast channels 470). This is based on allocation per broadcast provider.

The ground wave zone 410 and the mobile zone 420 can be managed within each broadcast frequency band. The broadcast contents zone 421 and the broadcast associated information zone 422 can be consolidated or separately managed within the mobile zone, as illustrated in FIG. 4A.

FIG. 5 is a diagram illustrating a structure of an ensemble provided by a mobile zone 520 of a broadcast frequency band of a specific broadcast provider in accordance with one embodiment of the present invention. As previously described, the broadcast frequency band can be classified into the ground wave zone 510 and the mobile zone 520.

The mobile zone 520 can provide at least one of the ensembles 531 to 533. Each of the ensembles 531 to 533 includes at least one broadcast channel (or service) provided by the corresponding broadcast provider and configuration information of at least one broadcast channel. In particular, at least one broadcast provider can be allocated to one ensemble. Configuration information of the broadcast channel can be acquired by a scan process of the corresponding ensemble.

For example, in the ATSC-MH, configuration information of the broadcast channel included in the ensemble may be referred to as service signaling channel tables (SSC-Table) 531-1 to 531-3. The SSC-Table can include GAT, SMT, SLT, and CIT among others.

The first ensemble 531 will be described in detail with regard to the ATSC-MH. The first ensemble 531 includes first to $N^{th}$ services (service 1 to N) and a configuration table (SSC-Table) 531-1 of the services included in the first ensemble 531.

For example, the first to $N^{th}$ services service 1 to N provide broadcast channels (for example, MBN-News, MBN-Sports, MBS-Drama, MBS-Movie) provided by at least one broadcast provider (for example, MBN, MBS) allocated to the first ensemble 531. Alternatively, the first to $N^{th}$ services may provide broadcast guide information, including broadcast guide receiving associated information, of at least one broadcast provider allocated to the first ensemble 531 through one service. The configuration table (SSC-Table) 531-1 can provide channel connection information (GAT) for each broadcast provider and decoding information (SMT) of the services included in the first ensemble 531.

In accordance with ensemble configuration, a specific ensemble of a plurality of ensembles may be allocated separately to provide broadcast guide information. Broadcast guide information of the service provided by the other ensembles may be provided to the specific ensemble.

Structures of channel connection information for each broadcast provider, broadcast guide receiving associated information, and broadcast guide information according to the present invention will be described with reference to FIG. 6 to FIG. 9. For convenience, a data structure of each of the channel connection information (GAT and SMT) for each broadcast provider, broadcast guide receiving associated information (SGDD) and broadcast guide information, which are used in the ATSC-MH, will be described.

As shown in FIG. 6, the broadcast associated information includes SGDD 610, which includes channel connection information of a channel, and at least one SGDU 620 to 660 provided for each data type or fragment. The channel provides the SGDU. In more detail, the SGDUs 620 to 660 can include SGDU including service fragment 620 of which the data type is a service, SGDU including schedule fragment 630 of which the data type is schedule data, SGDU including contents fragment 640 of which the data type is contents data, SGDU including preview fragment 650 of which the data type is preview data, and SGDU including interactive fragment 660 of which data type is interactive data.

Particularly, the SGDU 620 of which the data type is a service has matching information with identification information set for each of the other SGDUs 630 to 660 and information required for output of each of the other SGDUs 630 to 660. Accordingly, the mobile terminal 100 can identify matching information corresponding to identification information of a specific SGDU from the SGDU 620 of which data type is a service and can output the specific SGDU using information associated with the identified matching information.

Referring to FIG. 7A, the GAT can include identification information 701, 702, 703 of the corresponding broadcast provider. For example, the identification information can include broadcast provider name (SG_provider_name) 703, service ID (MH_service_Id) 701, and announcement channel information (announcement_channel_tsI) 702. The broadcast provider whose broadcast provider name is included in the GAT can be regarded as a broadcast provider that provides the corresponding broadcast guide information.

As shown in FIG. 7B, the mobile terminal 100 can identify a service ID (MH_service_Id) 711, which is matched with service ID (MH_service_Id) 701 included in the GAT shown in FIG. 7A, from the SMT. The mobile terminal 100 can extract channel connection information of SGDD associated with the identified service ID (MH_service_Id) 711. For example, the channel connection information of the SGDD extracted from the SMT can include a source_IP_address and MH_service_destination_IP_address 720 as well as component_destination_UDP_port_num and component_destination_IP_address 730.

The mobile terminal 100 can open a channel or session, which provides corresponding SGDD, by the using announcement channel information (anouncement_channel_tsI) 702 included in the GAT and the source_IP_address and component_destination_IP_address (hereinafter, referred to as SGDD channel connection information) included in the SMT. The MH_service_destination_IP_address may be used if the source_IP_address and component_destination_IP_address do not exist. The mobile terminal 100 can receive the SGDD through the opened channel.

If a specific broadcast provider is selected by a user, the mobile terminal 100 can identify the same identification information as the identification information of the selected specific broadcast provider from the GAT. The mobile terminal 100 can receive the SGDD only of the selected specific broadcast provider by using the channel connection information corresponding to the identified identification information.

As shown in FIG. 8, the SGDD can include information required for reception of the SGDU. This information may be SGDD identification information 810, descriptor entry information 820, channel connection information 830 that provides SGDU, and data type or fragment information 840 set in the SGDU. The mobile terminal 100 can identify ServiceGuideDeliveryUnit information included in the descriptor entry information 820 and can identify the data type or fragment set in the corresponding SGDU by using the data type or fragment corresponding to the identified ServiceGuideDeliveryUnit information.

For example, it is determined from the data type or fragment information 840 that service fragment is set in the corresponding SGDU if fragment type=1, contents fragment is set in the corresponding SGDU if fragment type=2, schedule fragment is set in the corresponding SGDU if fragment type=3, preview data fragment is set in the corresponding SGDU if fragment type=8, and interactive data fragment is set in the corresponding SGDU if fragment type=9. If a specific data type is selected by the user, the mobile terminal 100 can identify whether the same data type as the selected specific data type is set in the SGDU by using the SGDD, specifically the data type or fragment information 840.

The mobile terminal 100 can open a channel or session, which provides the corresponding SGDU, by using data included in the channel connection information 830 providing the SGDU and can receive the corresponding SGDU through the opened channel. For example, the channel connection information 830 can include an IP address (ipAddress) of the corresponding SGDU, port information, and a transmission session ID (TSI).

FIG. 9 illustrates a structure of the SGDU received using the channel connection information 830 of the SGDD. Referring to FIG. 9, the SGDU can include a corresponding data type or fragment 901 and broadcast guide information 902 encapsulated to be suitable for the corresponding data type.

The mobile terminal 100 can extract broadcast guide information to be provided by opening the broadcast guide information 902 encapsulated to be suitable for the corresponding data type. Although not shown, if the data type or fragment information 901 of the SGDU is not provided separately by the using SGDD and SGDU, the mobile terminal 100 can identify the data type of the SGDU by identifying the actual broadcast guide information included in the SGDU.

Figure 11:
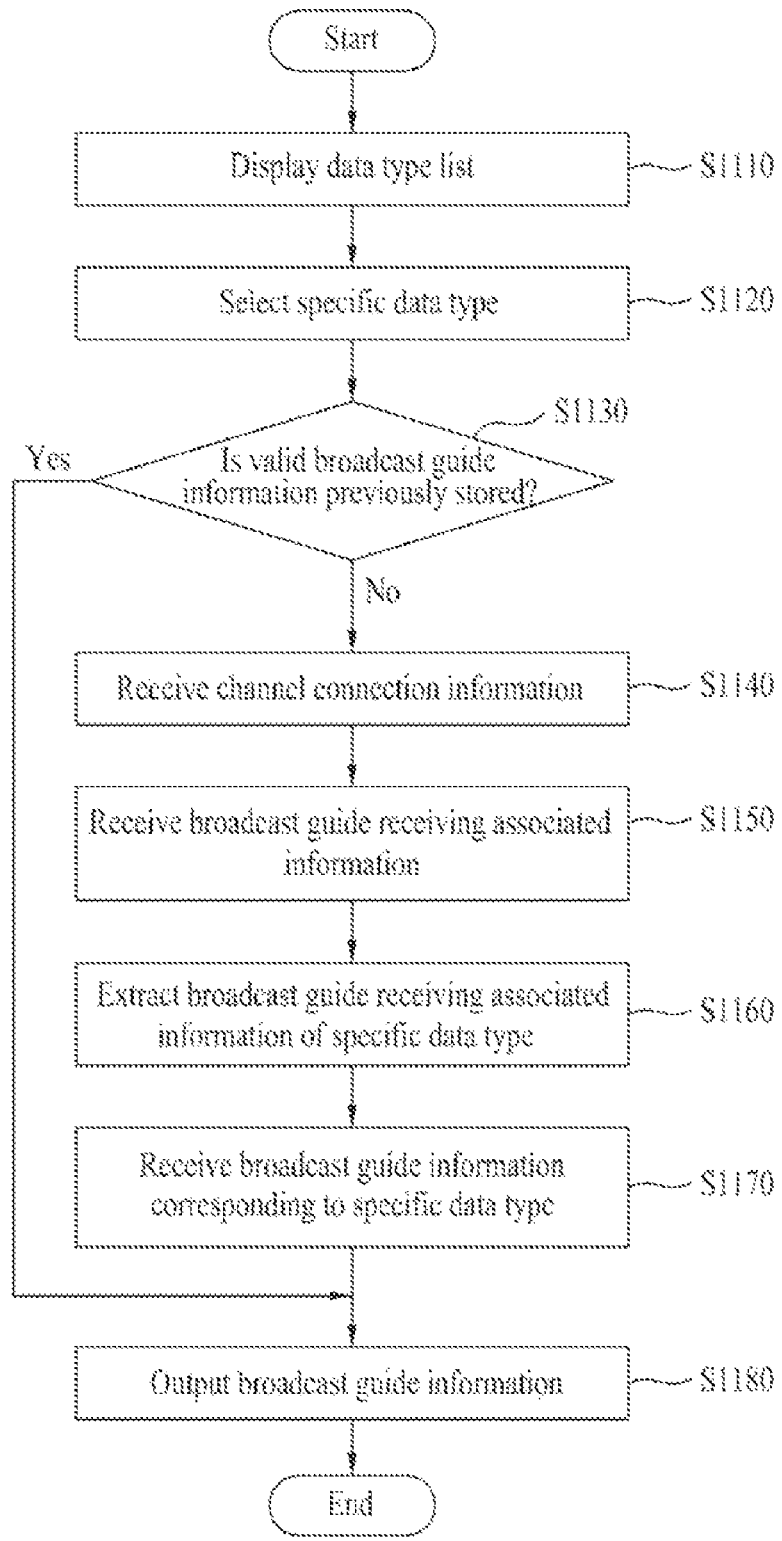
Figure 12:
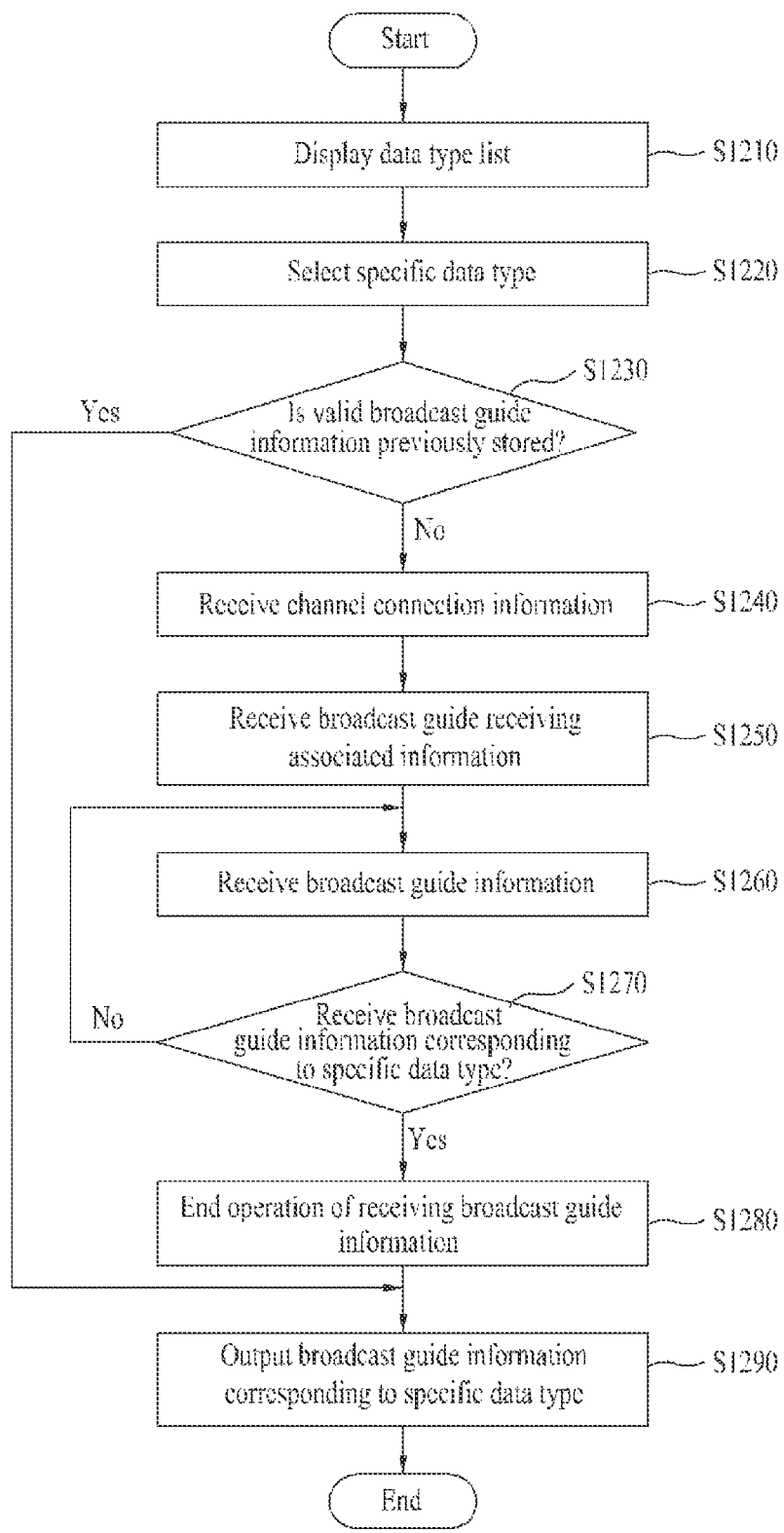

A method for controlling broadcast at a mobile terminal according to the present invention will be described with reference to the FIGS. 10 to 19B. FIG. 10 to FIG. 12 are flow charts of a method for controlling broadcast in a mobile terminal according to the present invention. For convenience, it is assumed that at least one broadcast provider exists.

A first embodiment of a process for receiving broadcast guide information using a broadcast provider list will be described with reference to FIG. 10. Referring to FIG. 10, the mobile terminal 100 displays a broadcast provider list via the display unit 151, where the broadcast provider list includes at least one broadcast provider having corresponding broadcast guide information that exists (S1010).

The broadcast provider list can include identification information. For example, name, number, and identification icon for each broadcast provider may be included.

It can be determined that corresponding broadcast guide information exists. The determination can be made through a broadcast provider of which identification information, such as provider name, is included in the GAT acquired by a scan process of a broadcast frequency band.

The mobile terminal 100 may have previously stored broadcast provider information having corresponding broadcast guide information, may download the broadcast provider information from an external server or terminal, or may extract the broadcast provider information from the GAT acquired by the scan process. The mobile terminal 100 can generate the broadcast provider list by using the acquired broadcast provider information, where the broadcast provider lists include broadcast provider(s) having corresponding broadcast guide information.

A broadcast channel list may be displayed as one of the broadcast provider lists (S1010), where the broadcast channel list includes broadcast channels managed by at least one broadcast provider having corresponding broadcast guide information.

A process for displaying a broadcast provider list will be described with reference to FIGS. 13A to 13E. FIG. 13A to FIG. 13E are schematic views illustrating a screen that displays a broadcast provider list in accordance with the present invention.

As shown in FIG. 13A(a), if a menu item 1301 corresponding to broadcast provider list viewing is selected by the user through menu search, the mobile terminal 100 can display an item list for broadcast provider list viewing, as illustrated in FIG. 13A(b). The user can select a menu item for broadcast provider list viewing through menu search during a standby state, broadcast output state, or driving of another application, such as MP3 play or Internet access. Although not shown, if a key or a key zone of a touch screen corresponding to the broadcast provider list viewing is selected, the mobile terminal 100 may display the item list for broadcast provider list viewing as well as menu search.

Figure 13B:
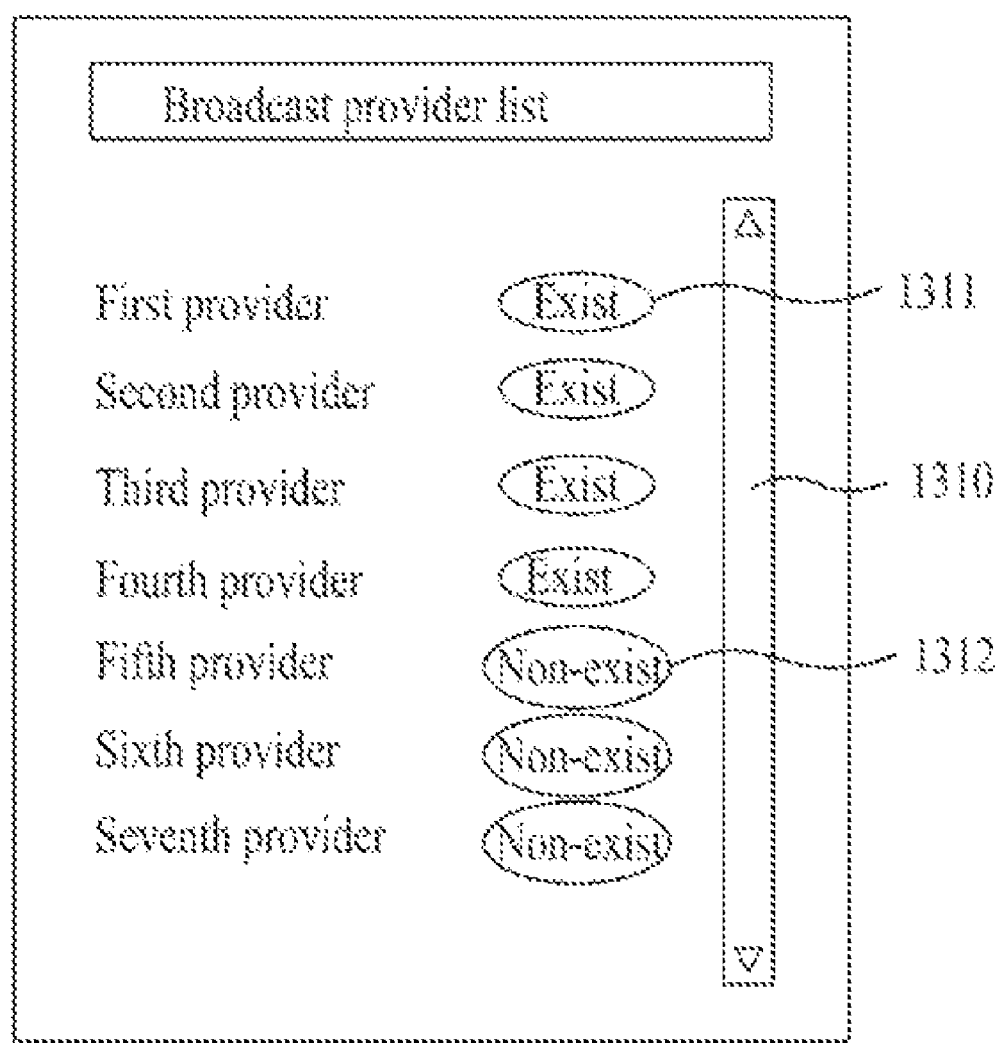

If 'Entire' 1302 is selected in FIG. 13A(b), the mobile terminal 100 displays an entire broadcast provider list 1310, as illustrated in FIG. 13B. The mobile terminal 100 can identify existence of a broadcast provider 1311 that provides broadcast guide information and non-existence of a broadcast provider 1312 on the broadcast provider list 1310.

If 'Broadcast information existence' 1303 is selected in FIG. 13A(b), the mobile terminal 100 may display a broadcast provider list 1320 configured only by broadcast providers among all the broadcast providers that provide broadcast guide information, as illustrated in FIG. 13C(a). If 'Nonexist' 1321 is selected in FIG. 13C(a), the mobile terminal 100 can display a broadcast provider list configured only by broadcast providers that do not provide broadcast guide information, as illustrated in FIG. 13C(b).

If "Broadcast information nonexistence' 1304 is selected in FIG. 13A(b), the mobile terminal 100 may display a broadcast provider list 1330 configured only by broadcast providers among all the broadcast providers that do not provide broadcast guide information, as illustrated in FIG. 13C(b). If 'Exist' 1331 is selected in FIG. 13C(b), the mobile terminal 100 can display a broadcast provider list configured only by broadcast providers that provide broadcast guide information, as illustrated in FIG. 13C(a).

If 'Entire' 1302 is selected in FIG. 13A(b), the mobile terminal 100 may display a broadcast provider list 1340 configured by broadcast channels managed by all the broadcast providers and may identify whether or not broadcast guide information exists on the broadcast channel list, as illustrated in FIG. 13D(a). If 'Broadcast information existence' 1303 is selected in FIG. 13A(b), the mobile terminal 100 may display a broadcast provider list 1350 configured only by broadcast channels among broadcast channels managed by all the broadcast providers that provide broadcast guide information, as illustrated in FIG. 13D(b).

Figure 13E:
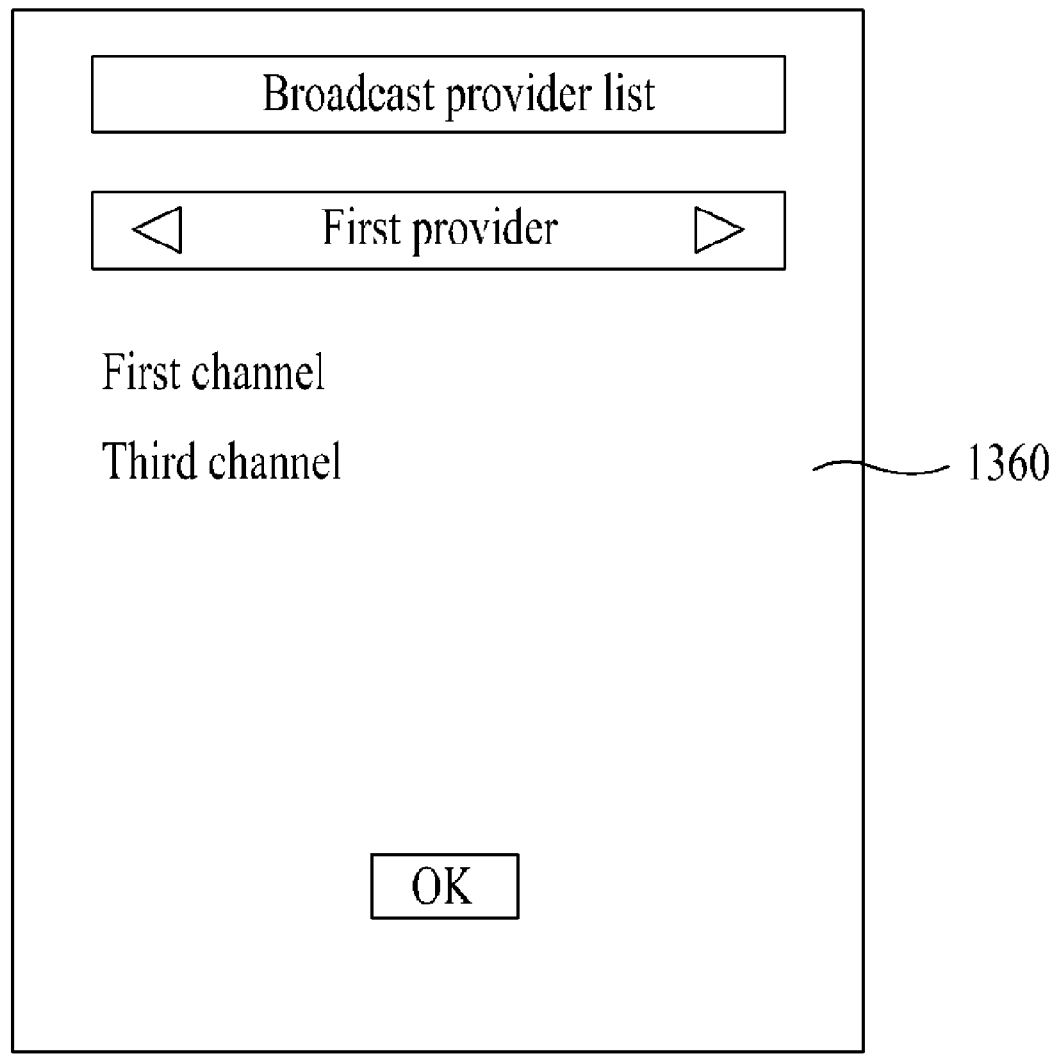

The mobile terminal 100 can display a corresponding broadcast channel list 1360 for each broadcast provider, where the broadcast channel list is configured by broadcast providers that provide broadcast guide information, as illustrated in FIG. 13E. The user can identify the broadcast channel and the broadcast provider for which broadcast guide information exists.

Although not shown, if a menu item corresponding to broadcast provider list viewing is selected through menu search, the mobile terminal 100 may display a list of all broadcast providers that indicates existence/nonexistence and identification of broadcast guide information. The mobile terminal 100 may also display a broadcast provider list configured by broadcast providers that provide broadcast guide information by skipping the process for displaying the previously described condition list.

Referring again to FIG. 10, the mobile terminal 100 receives a selection of a specific broadcast provider from the displayed broadcast provider list via the user input unit 130 (S1020). The mobile terminal 100 determines whether valid broadcast guide information corresponding to the selected broadcast provider is previously stored in the memory unit 160 (S1030).

The mobile terminal 100 first determines if any broadcast guide information corresponding to the selected broadcast provider is previously stored in the memory unit 160. If broadcast guide information is previously stored in the memory unit 160, the mobile terminal 100 determines whether the duration of the stored broadcast guide information has expired.

If the duration of the broadcast guide information has expired, the mobile terminal 100 determines that valid broadcast guide information corresponding to the selected broadcast provider is not previously stored in the memory unit 160. If the duration of the stored broadcast guide information has not expired, the mobile terminal 100 determines that valid broadcast guide information corresponding to the selected broadcast provider is previously stored in the memory unit. If it is determined that broadcast guide information corresponding to the selected broadcast provider is not previously stored in the memory unit 160, the mobile terminal 100 determines that valid broadcast guide information corresponding to the selected broadcast provider is not stored in the memory unit.

For example, if the valid duration of the previously stored broadcast guide information is from on Sep. 10, 2009 to Sep. 20, 2009 and the present day is Sep. 22, 2009, the mobile terminal 100 determines that valid broadcast guide information is not stored in the memory unit 160. However, if the present day is Sep. 15, 2009, the mobile terminal 100 determines that the valid broadcast guide information is previously stored in the memory unit 160.

The determination whether valid broadcast guide information of the selected specific broadcast provider is stored (S1030) is not required. Accordingly, the determination (S1030) may be skipped.

If it is determined the valid broadcast guide information corresponding to the selected broadcast provider is not previously stored in the memory unit 160, the mobile terminal 100 receives channel connection information of the broadcasting guide receiving associated information for each broadcast provider through the wireless communication unit 110 (S1040). Specifically, the mobile terminal 100 may receive the channel connection information via the broadcast receiving module 111.

If the determination (S1030) is skipped, the mobile terminal 100 may directly receive the channel connection information (S1040) without determining whether valid broadcast guide information of the selected broadcast provider is stored. The channel connection information may be provided for each broadcast provider or may be provided for each broadcast channel provided by the broadcast provider.

For example, GAT and SMT can be used in the ATSC-MH as the channel connection information, as illustrated in FIG. 7A and FIG. 7B. The GAT and SMT can be included in the SSC-Table which is included in the ensemble.

The channel connection information may be acquired (S1040) by the scan process of the broadcast frequency band, specifically the mobile zone. The channel connection information may be acquired in a unit of ensemble if a plurality of ensembles is provided, as illustrated in FIG. 5.

The mobile terminal 100 extracts the channel connection information corresponding to the selected broadcast provider from the received channel connection information (S1050). For example, according to the ATSC-MH, the mobile terminal 100 identifies identification information for each broadcast provider from the GAT, identifies a service ID matched with the service ID (MH_service_Id) of the identified identification information from the SMT, and extracts channel connection information associated with the identified service ID from the SMT, as illustrated in FIG. 7A and FIG. 7B.

The extracted channel connection information can include announcement channel information (announcement_channel_tsI) included in the GAT and source_IP_address and component_destination_IP_address included in the SMT corresponding to the service ID of the selected broadcast provider. The MH_service_destination_IP_address may be used if the source_IP_address and component_destination_IP_address do not exist.

The mobile terminal 100 receives broadcast guide receiving associated information corresponding to the selected broadcast provider by using the extracted channel connection information (S1060). Specifically, the broadcast guide receiving associated information can be received via the broadcast receiving module 111. The broadcast guide receiving associated information may be provided to each of the broadcast channels provided by the broadcast provider.

The mobile terminal 100 can open a channel or session, which provides SGDD as broadcast guide receiving associated information corresponding to the selected broadcast provider, by using the extracted channel connection information. The mobile terminal 100 can receive the SGDD corresponding to the selected broadcast provider through the opened channel. Accordingly, the mobile terminal 100 can receive only the SGDD corresponding to the selected broadcast provider, thereby reducing the time required to receive the SGDD.

The mobile terminal 100 receives broadcast guide information corresponding to the selected broadcast provider by using the received broadcast guide receiving associated information (S1070). For example, the mobile terminal 100 can open a channel or session, which provides SGDD corresponding to the selected broadcast provider, by using data included in channel connection information 830 (see FIG. 8) that provides SGDU as broadcast guide information of the SGDD and can receive the SGDU corresponding to the selected broadcast provider through the opened channel. The channel connection information 830 can include the IP address (ipAddress) of the corresponding SGDU, port information, and the transmission session ID (transmissionSessionID).

Receiving channel connection information (S1040), extracting channel connection information (S1050) and receiving broadcast guide receiving associated information (S1070) may be performed periodically for a preferred broadcast channel or a broadcast provider that manages the preferred broadcast channel if the preferred broadcast channel is set, or may be performed per preferred broadcast channel. Specifically, the selected specific broadcast provider may be regarded as a broadcast provider that manages the preferred broadcast channel. If corresponding broadcast guide information is updated by a server that provides broadcast guide information prior to the duration set in the broadcast guide information, the mobile terminal 100 can update the previously stored broadcast guide information by receiving the updated broadcast guide information from the server.

The mobile terminal 100 should receive the broadcast guide receiving associated information (S1060) prior to receiving the broadcast guide information (S1070). The mobile terminal can receive the corresponding broadcast guide information (S1070) by using the received broadcast guide receiving associated information. This process is equally applicable to the previously stored broadcast guide receiving associated information since, if different types of guide information are applied to one broadcast provider or broadcast channel, different types of broadcast guide receiving associated information are applicable.

Figure 14A:
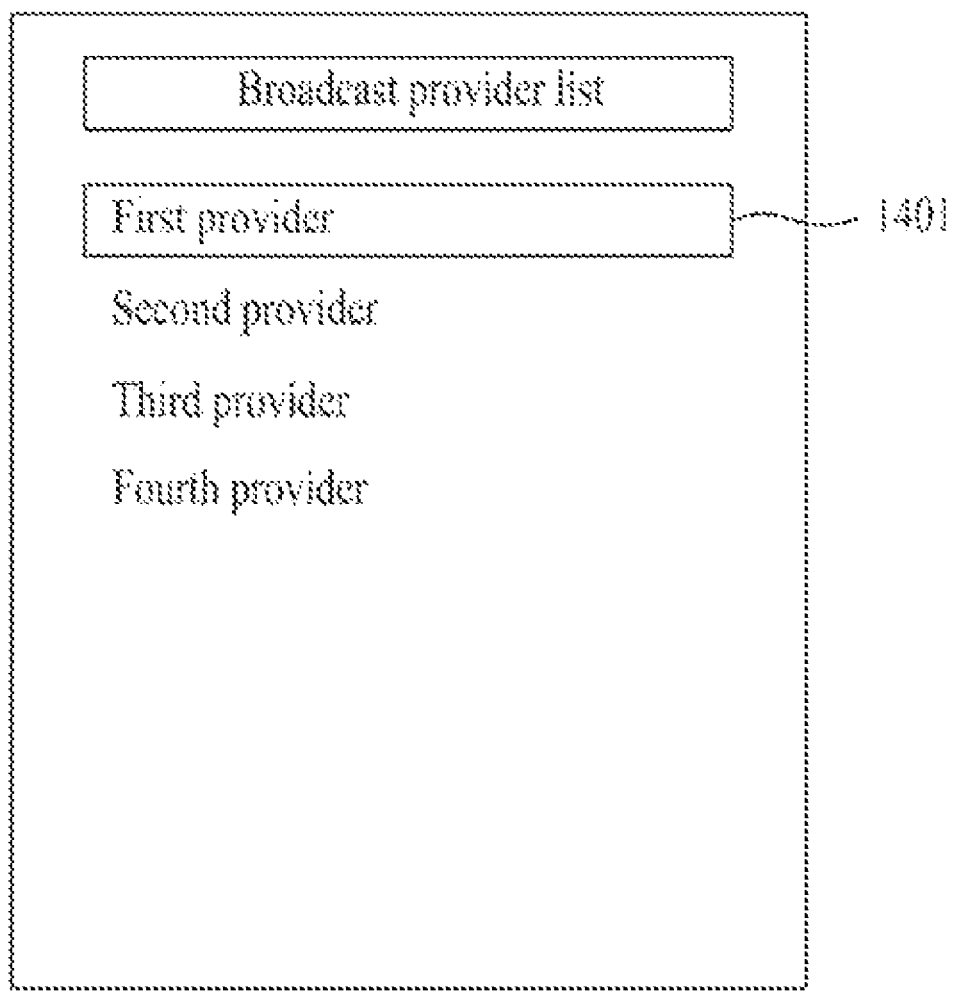

A screen configuration of a process for receiving broadcast guide information (S1070) in accordance with the first embodiment of the present invention will be described with reference to FIGS. 14A to 15D. FIG. 14A to FIG. 14C are schematic views of a screen illustrating a process for receiving broadcast guide information (S1070) of a specific broadcast provider in accordance with the present invention.

The mobile terminal 100 can receive a specific broadcast provider 1401 included in a broadcast provider list from the user when the broadcast provider list is displayed, as illustrated in FIG. 14A. It is assumed that the broadcast provider list is configured by broadcast providers that provide broadcast guide information.

Referring to FIG. 14B(a), if it is determined that valid broadcast guide information does not exist for the specific broadcast provider 1401, the mobile terminal 100 allows the user to select whether to receive the corresponding broadcast guide information by notifying the user that the valid broadcast guide information does not exist. If 'Yes' is selected in FIG. 14B(a), the mobile terminal 100 receives broadcast guide information corresponding to the specific broadcast provider 1401 and displays a window 1420 indicating a receiving level of the corresponding broadcast guide information, as illustrated in FIG. 14B(b).

Referring to FIG. 14C(a), if it is determined that the valid broadcast guide information exists for the specific broadcast provider 1401, the mobile terminal 100 allows the user to select to either 'Output' the valid broadcast guide information or 'Receive' the broadcast guide information. If 'Output' is selected in FIG. 14C(a), the mobile terminal 100 outputs the previously stored broadcast guide information (S1080), as illustrated in FIG. 14C(b).

For example, if a plurality of broadcast channels managed by the specific broadcast provider 1401 is provided, the mobile terminal 100 outputs broadcast guide information for each broadcast channel. Alternatively, if 'Receive' is selected in (a) of FIG. 14C(a), the mobile terminal 100 receives new broadcast guide information (S1070) even if valid broadcast guide information exists.

FIG. 15A to FIG. 15D are schematic views of a screen illustrating a process for receiving broadcast guide information (S1070) of a specific broadcast channel of a specific broadcast provider in accordance with the present invention. For convenience, it is assumed that the specific broadcast provider manages a plurality of broadcast channels.

Referring to FIG. 15A(a), the mobile terminal 100 can receive a specific broadcast provider 1501 included in a broadcast provider list from the user, where the broadcast provider list is configured by broadcast providers that provide broadcast guide information. The mobile terminal 100 can also display a broadcast channel list configured by a plurality of broadcast channels managed by the selected specific broadcast provider 1501, as illustrated in FIG. 15A(b).

If a specific broadcast channel 1502 is selected by the user from the broadcast channel list shown in FIG. 15A(b), the mobile terminal 100 determines whether valid broadcast guide information corresponding to the selected specific broadcast channel 1502 exists (S1030). It is assumed that broadcast guide information is provided for each broadcast channel.

Referring to FIG. 15B(a), if it is determined that valid broadcast guide information does not exist for the specific broadcast channel 1502, the mobile terminal 100 allows the user to select whether to receive the corresponding broadcast guide information by notifying the user that the valid broadcast guide information does not exist. If 'Yes' is selected in FIG. 15B(a), the mobile terminal 100 receives broadcast guide information corresponding to the specific broadcast channel 1502 (S1070) and displays a window 1520 indicating a receiving level of the corresponding broadcast guide information, as illustrated in FIG. 15B(b).

If it is determined that the valid broadcast guide information exists for the specific broadcast channel 1502, the mobile terminal 100 allows the user to select to either 'Output' the valid broadcast guide information or 'Receive' the broadcast guide information, as illustrated in FIG. 15C(a). If 'Output' is selected in FIG. 15C(a), the mobile terminal 100 outputs the broadcast guide information previously stored for the specific broadcast channel 1502 (S1080), as illustrated in FIG. 15C (b). Alternatively, if 'Receive' is selected in FIG. 15C(a), the mobile terminal 100 receives new broadcast guide information for the specific broadcast channel 1502 (S1070) even if valid broadcast guide information exists.

If a specific broadcast provider that manages a plurality of broadcast channels, hereinafter referred to as first and second broadcast channels, of the broadcast provider list is selected, the mobile terminal 100 determines whether valid broadcast guide information exists for each of the first and second broadcast channels managed by the specific broadcast provider. Referring to FIG. 15D(a), if it is determined that valid broadcast guide information exists for the first broadcast channel but does not exist for the second broadcast channel, the mobile terminal 100 allows the user to select one of reception of the entire broadcast guide information, output of valid broadcast guide information of the first broadcast channel, or reception of broadcast guide information of the second broadcast channel by notifying the user of the presence of the valid broadcast guide information for each broadcast channel.

If 'Second CH reception' is selected in FIG. 15D(a), the mobile terminal 100 receives only the broadcast guide information of the second broadcast channel, as illustrated in FIG. 15D(b). Meanwhile, although not shown, if 'Entire reception' is selected in FIG. 15D(a), the mobile terminal 100 receives both the broadcast guide information of the first broadcast channel and the broadcast guide information of the second broadcast channel. If 'First CH output' is selected in FIG. 15D(a), the mobile terminal 100 outputs the valid broadcast guide information of the first broadcast channel.

Returning to FIG. 10, the mobile terminal 100 outputs the received broadcast guide information via the output unit 150 (S1080). The broadcast guide information can include broadcast guide information that provides schedule data, broadcast guide information that provides contents associated data, broadcast guide information that provides broadcast preview data, and broadcast guide information that provides interactive data, depending on a set data type or fragment type.

Outputting the broadcast guide information (S1080) may be performed when an output command signal is received from the user or may be performed automatically if reception of the broadcast guide information is completed. The screen configuration related to the output of the broadcast guide information (S1080) will be described later in detail.

A process for receiving broadcast guide information using a data type list according to a second embodiment of the invention will be described in detail with reference to FIG. 11. Referring to FIG. 11, the mobile terminal 100 displays a data type list via display unit 151, where the data type list includes at least one data type corresponding to broadcast guide information (S1110).

The mobile terminal 100 may previously store at least one data type in the memory unit 160, may download or receive the data type from an external server or terminal, or may extract the data type from the previously received broadcast guide information, where the data type can be set in the broadcast guide information. Accordingly, the mobile terminal 100 can generate the data type list by using the previously stored data type, the downloaded or received data type, or the extracted data type.

For example, the data type represents types or contents of the broadcast guide information and can include contents data, preview data, schedule data and interactive data. Specifically, the data type in the ATSC-MH may be referred to as a fragment type as previously described.

The mobile terminal 100 receives a specific data type of the displayed data type list via the user input unit 130 (S1120). The mobile terminal 100 determines whether valid broadcast guide information corresponding to the selected data type is previously stored in the memory unit 160 (S1130) by first determining if any broadcast guide information corresponding to the selected data type is previously stored in the memory unit. If the broadcast guide information is previously stored in the memory unit 160, the mobile terminal 100 determines whether the duration of the previously stored broadcast guide information has expired.

If the duration of the broadcast guide information has expired, the mobile terminal 100 determines that valid broadcast guide information corresponding to the selected data type is not previously stored in the memory unit 160. If the duration of the broadcast guide information has not expired, the mobile terminal 100 determines that valid broadcast guide information corresponding to the selected data type is previously stored in the memory unit 160. If it is determined that broadcast guide information corresponding to the selected data type is not previously stored in the memory unit 160, the mobile terminal 100 determines that valid broadcast guide information corresponding to the selected data type is not stored in the memory unit 160.

If it is determined that valid broadcast guide information corresponding to the selected data type is not previously stored in the memory unit 160, the mobile terminal 100 receives channel connection information of the broadcast guide receiving associated information for each broadcast provider via the wireless communication unit 110 (S1140). Since receiving channel connection information is performed in the same manner as in FIG. 10, no detailed description will be provided.

The mobile terminal 100 receives broadcast guide receiving associated information by using the received channel connection information (S1150). For example, according to the ATSC-MH, the mobile terminal 100 identifies identification information for each broadcast provider from the GAT, identifies a service ID matched with the service ID (MH_service_Id) of the identified identification information from the SMT, and extracts channel connection information associated with the identified service ID from the SMT, as illustrated in FIG. 7A and FIG. 7B.

The mobile terminal 100 extracts the channel connection information for each broadcast provider. Examples of the extracted channel connection information can include announcement channel information (announcement_channel_tsI) included in the GAT and source_IP_address and component_destination_IP_address included in the SMT corresponding to the service ID of the selected broadcast provider. The MH_service_destination_IP_address may be used if the source_IP_address and component_destination_IP_address do not exist.

The mobile terminal 100 can open a channel or session, which provides SGDD as broadcast guide receiving associated information for each broadcast provider, by using the extracted channel connection information, and can receive the SGDD for each broadcast provider via the opened channel. A plurality of broadcast providers may provide one SGDD or the SGDD may be provided to each of a plurality of broadcast channels provided by one broadcast provider. Accordingly, the mobile terminal 100 can receive broadcast guide receiving associated information (S1150) by using the extracted channel connection information.

The mobile terminal 100 extracts broadcast guide receiving associated information corresponding to the selected data type from the received broadcast guide receiving associated information 180 (S1160). The broadcast guide receiving associated information includes data type or fragment type information set in the SGDU as broadcast guide information) and channel connection information of the corresponding SGDU.

According to the ATSC-MH, the mobile terminal 100 can identify ServiceGuideDeliveryUnit information included in the descriptor entry information 820 and can identify whether the selected data type is set in the SDGU by using the data type or fragment information 840 (FIG. 8) corresponding to the identified ServiceGuideDeliveryUnit information. For example, it is determined that the selected data type is set in the SGDU if the selected data type is schedule data or schedule fragment and fragment type=3 is set in the data type or fragment information 840.

Accordingly, the mobile terminal 100 can extract the SGDD of the SGDU as broadcast guide information where the selected data type is set. For example, the extracted SGDD can include the IP address (ipAddress) of the corresponding SGDU, port information and the transmission session ID (transmissionSessionID) as the channel connection information of the SGDU where the selected data type is set.

The mobile terminal 100 receives the broadcast guide information corresponding to the selected data type via the wireless communication unit 110 by using the extracted broadcast guide receiving associated information (S1170). The mobile terminal 100 can open a channel or session, which provides the SGDU corresponding to the selected data type, by using the channel connection information included in the extracted broadcast guide receiving associated information and can receive the SGDU corresponding to the selected data type via the opened channel.

If the SGDU is received, the mobile terminal 100 can identify that the received SGDU corresponds to the selected data type if identification information, such as TransportObjectID of the received SGDU, is matched with identification information, such as TransportObjectID of the extracted broadcast guide receiving associated information. Alternatively, if the SGDU is received, the mobile terminal 100 can identify that the received SGDU corresponds to the selected data type if a fragment type 901 set in the received SGDU is matched with the selected fragment type (see FIG. 9).

The mobile terminal 100 can simply and exactly identify the data type or fragment type of the received SGDU even without opening the received SGDU. The mobile terminal 100 outputs the received broadcast guide information via the output unit 150 (S1180).

For example, the mobile terminal can output only the broadcast guide information corresponding to the selected data type. The screen configuration related to outputting the broadcast guide information (S1180) will be described later in detail.

A process for receiving broadcast guide information using a data type list according to a third embodiment of the invention will be described in detail with reference to FIG. 12. In FIG. 12, it is assumed that data type information is not included in the broadcast guide receiving associated information.

Referring to FIG. 12, the mobile terminal 100 displays a data type list (S1210) and receives a selection of a specific data type from the displayed data type list (S1220). The mobile terminal 100 determines whether valid broadcast guide information corresponding to the selected data type is previously stored in the memory unit 160 (S1230).

If it is determined that the valid broadcast guide information is not previously stored in the memory unit 160, the mobile terminal 100 receives channel connection information for each broadcast provider (S1240) and receives broadcast guide receiving associated information by using the received channel connection information (S1250). Since the aforementioned steps S1210 to S1250 are performed in the same manner as in FIG. 11, a detailed description will not be provided.

The mobile terminal 100 receives broadcast guide information by using the received broadcast guide receiving associated information (S1260). For example, since the received broadcast guide receiving associated information includes channel connection information of the SGDU as broadcast guide information for each broadcast provider, the mobile terminal 100 can open the corresponding channel by using the channel connection information for each broadcast provider and receive the SGDU of the corresponding broadcast provider via the opened channel. A plurality of broadcast providers may provide one SGDD or the SGDD may be provided to each of a plurality of broadcast channels provided by one broadcast provider.

The mobile terminal 100 identifies whether the received broadcast guide information is the broadcast guide information corresponding to the selected data type (S1270). For example, the mobile terminal 100 can identify data contents included in the received broadcast guide information and data type by decoding the received broadcast guide information.

If it is identified that broadcast guide information corresponding to the selected data type has been received, the mobile terminal 100 ends the operation of receiving the broadcast guide information (S1280). For example, the broadcast guide information can include broadcast guide information of contents data, broadcast guide information of schedule data, and broadcast guide information of preview data, depending on the data type. If the schedule data is selected (S1220), the mobile terminal 100 ends the operation of receiving the broadcast guide information (S1280) if reception of the broadcast guide information of schedule data is identified even if the broadcast guide information of contents data and the broadcast guide information of preview data is not received.

The mobile terminal 100 outputs the received broadcast guide information via the output unit 150 (S1290). For example, the mobile terminal can output only the broadcast guide information corresponding to the selected data type.

The screen configuration related in outputting the broadcast guide information (S1290) will be described later in detail.

A screen configuration of a process for receiving broadcast guide information (S1170, S1260) in accordance with the second and third embodiments of the present invention will be described with reference to FIGS. 16A to 17E. FIG. 16A to FIG. 16E are schematic views of a screen illustrating a process for receiving broadcast guide information corresponding to a specific data type (S1170, S1260) or specific fragment type in accordance with the present invention.

Figure 16A:
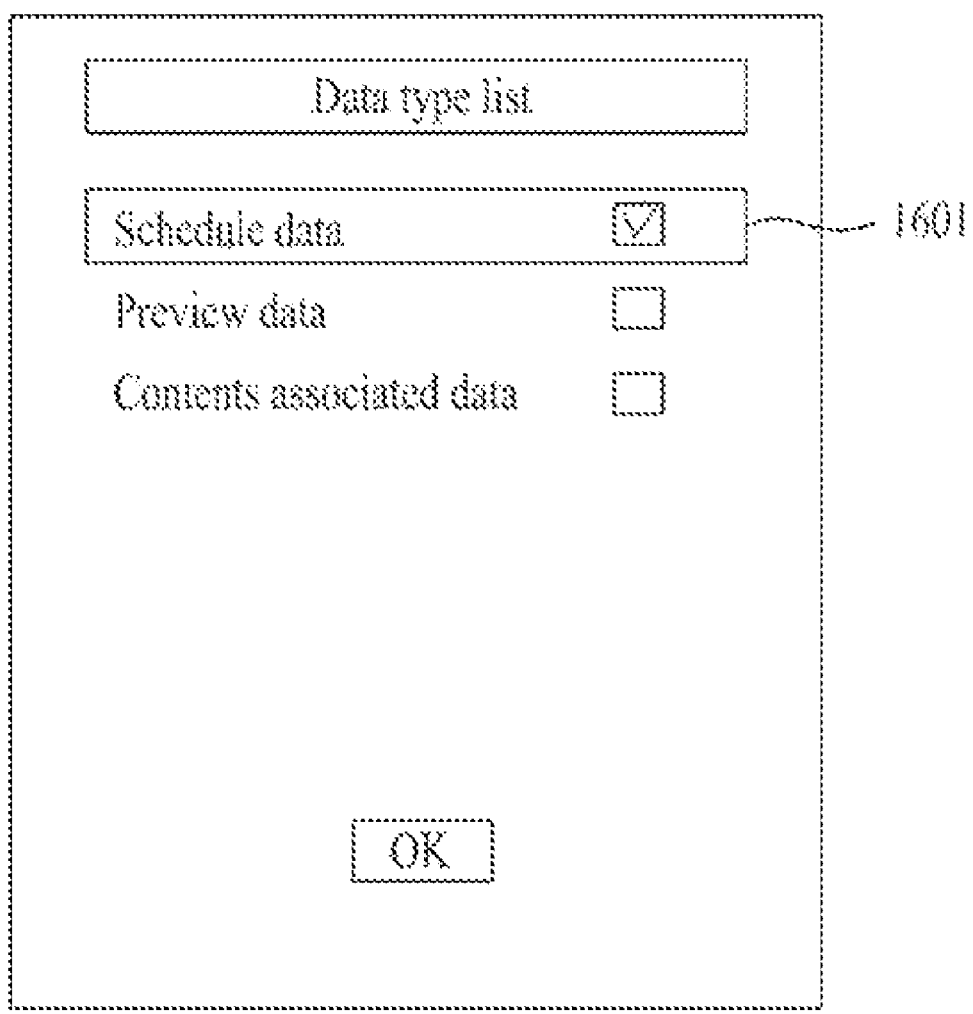

The mobile terminal 100 can receive schedule data 1601 from the user as a specific data type included in a data type list when the data type list is displayed, as illustrated in FIG. 16A. The data type list is configured by a data type corresponding to broadcast guide information.

Referring to FIG. 16B(a), if it is determined that valid broadcast guide information does not exist for the schedule data 1601, the mobile terminal 100 allows the user to select whether to receive the corresponding broadcast guide information by notifying the user that the valid broadcast guide information does not exist. If 'Yes' is selected in FIG. 16B(a), the mobile terminal 100 receives the broadcast guide information corresponding to the schedule data 1601 and displays a window 1620 indicating a receiving level of the corresponding broadcast guide information, as illustrated in FIG. 16B (b).

Figure 16C:
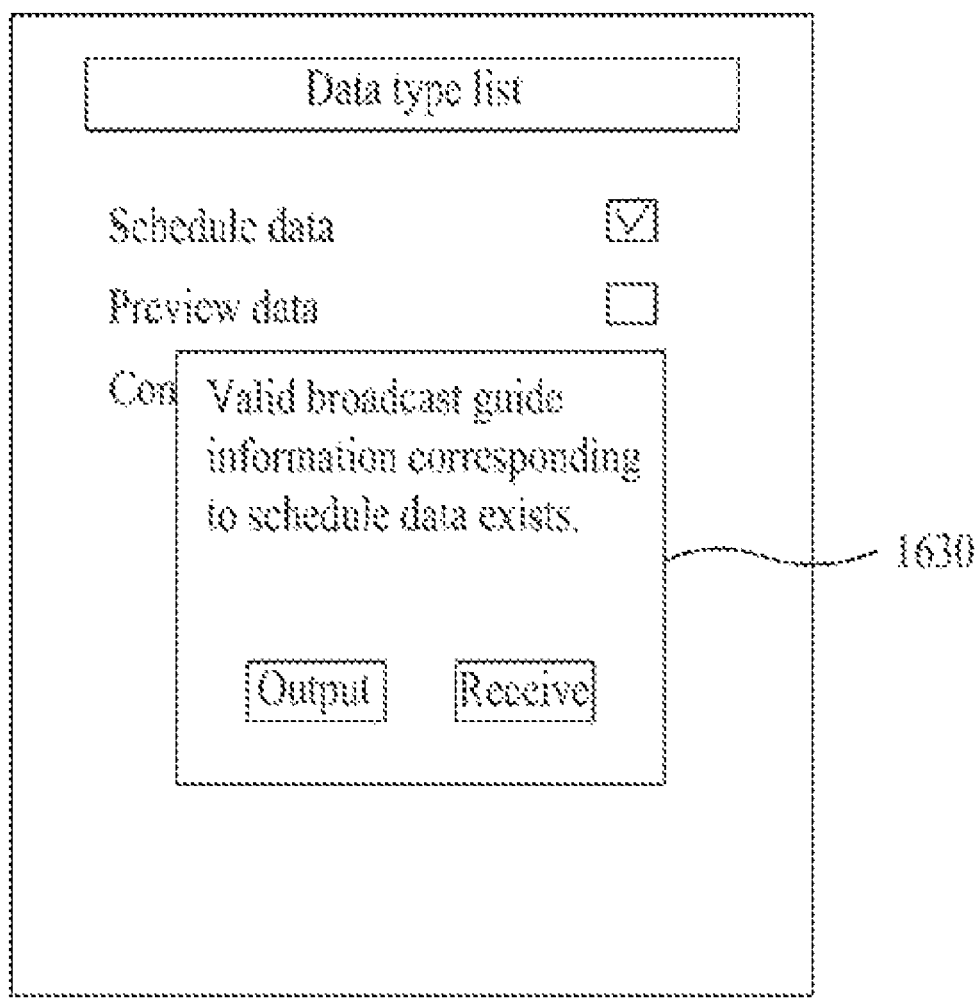

Referring to FIG. 16C, if it is determined that the valid broadcast guide information exists for the schedule data 1601, the mobile terminal 100 allows the user to select to either 'Output' the valid broadcast guide information or 'Receive' the broadcast guide information. If 'Output' is selected in FIG. 16C, the mobile terminal 100 outputs the broadcast guide information previously stored for the schedule data 1601 (S1180, S1290) (not shown).

For example, if there is a plurality of broadcast providers that provide the broadcast guide information corresponding to the schedule data, the mobile terminal 100 can output the broadcast guide information for each broadcast provider (S1180, S1290). Alternatively, if 'Receive' is selected in (a) of FIG. 16C, the mobile terminal 100 receives new broadcast guide information corresponding to the schedule data 1601 even if valid broadcast guide information exists (not shown).

Figure 16D:

If a specific data type is selected from the data type list assuming that a plurality of broadcast providers that provide corresponding guide information exist, the mobile terminal 100 determines whether valid broadcast guide information corresponding to the selected specific data type exists for each of the plurality of broadcast providers that provide the broadcast guide information corresponding to the specific data type. Referring to FIG. 16D(a), if is determined that valid broadcast guide information exists for first and fourth broadcast providers but does not exist for second and third broadcast providers, the mobile terminal 100 allows the user to select reception of the entire broadcast guide information, output of the valid broadcast guide information, or reception of invalid broadcast guide information of the second broadcast channel by notifying the user of the presence of the valid broadcast guide information for each broadcast provider.

If 'Invalid reception' is selected in FIG. 16D(a), the mobile terminal 100 receives only the broadcast guide information corresponding to the selected specific data type of the broadcast guide information of the second and third broadcast providers, as illustrated in FIG. 16D(b). Although not shown, if 'Entire reception' is selected in FIG. 16D(a), the mobile terminal 100 receives the broadcast guide information corresponding to the selected specific data type, which is selected from every broadcast guide information of the first to fourth broadcast providers. If 'Valid output' is selected in FIG. 16D (a), the mobile terminal 100 outputs the valid broadcast guide information corresponding to the selected specific data type, which is selected from the valid broadcast guide information of the first to fourth broadcast providers.

Referring to FIG. 16E(a), while receiving the broadcast guide information, the mobile terminal 100 can end the operation of receiving the broadcasts guide information in accordance with the user's selection if the broadcast guide information corresponding to the selected specific data type is received. The mobile terminal 100 may automatically end the operation of receiving the broadcasts guide information regardless of the user's selection if the broadcast guide information corresponding to the selected specific data type is received.

FIG. 17A to FIG. 17E are schematic views of a screen illustrating a process for receiving broadcast guide information corresponding to a specific data type and a specific broadcast provider (S1170, S1260) in accordance with the present invention. Referring to FIGS. 17A(a) and 17A(b), the mobile terminal 100 displays a data type list and then displays a broadcast provider list configured by broadcast provider(s) that provide(s) broadcast guide information corresponding to a specific data type selected from the data type list.

If 'Schedule data' 1702 and 'Contents data' 1703 are selected from the data type list shown in FIG. 17A(b) by the user, the mobile terminal 100 determines whether valid broadcast guide information among broadcast guide information of a specific broadcast provider 1701 with a data type of 'Schedule data' or 'Contents data' is previously stored in the memory unit 160.

Referring to FIG. 17B(a), if it is determined that the valid broadcast guide information is not previously stored in the memory unit 160, the mobile terminal 100 allows the user to determine whether to receive the valid broadcast guide information by notifying the user that the valid broadcast guide information is not previously stored in the memory unit 160. If 'Yes' is selected in FIG. 17B(a), the mobile terminal 100 receives the broadcast guide information having a data type of 'Schedule data' or 'Contents data' among the broadcast guide information of the specific broadcast provider 1701, as illustrated in FIG. 17B(b).

Alternatively, referring to FIG. 17C(a), if it is determined that valid broadcast guide information is previously stored in the memory unit 160, the mobile terminal 100 allows the user to select to either 'Output' the valid broadcast guide information or 'Receive' the broadcast guide information by notifying the user that valid broadcast guide information is previously stored in the memory unit. If 'Output' is selected in FIG. 17C(a), the mobile terminal 100 outputs the broadcast guide information of the specific broadcast provider 1701 having a data type of 'Schedule data' or 'Contents data,' as illustrated in FIG. 17C(b).

Referring to FIG. 17E(a), while receiving the broadcast guide information corresponding to the first broadcast provider, the mobile terminal 100 ends the operation of receiving the broadcasts guide information in accordance with the user's selection if the broadcast guide information corresponding to the selected specific data type is received. The mobile terminal 100 may automatically end the operation of receiving the broadcasts guide information regardless of the user's selection if the broadcast guide information corresponding to the selected specific data type is received.

According to the present invention, if the broadcast guide information is completely received in accordance with the first to third embodiments, the mobile terminal 100 determines whether the received broadcast guide information is previously stored in the memory unit 160. The mobile terminal 100 determines whether the broadcast guide information having identification information matched with identification information, such as version information of the received broadcast guide information, is stored in the memory unit 160.

If the broadcast guide information is not stored in the memory unit 160, the mobile terminal 100 stores the received broadcast guide information in the memory unit. If the broadcast guide information is stored in the memory unit 160, the mobile terminal 100 does not store the received broadcast guide information in the memory unit. This will be described in more detail with reference to FIG. 18A to FIG. 18C.

Figure 18A:
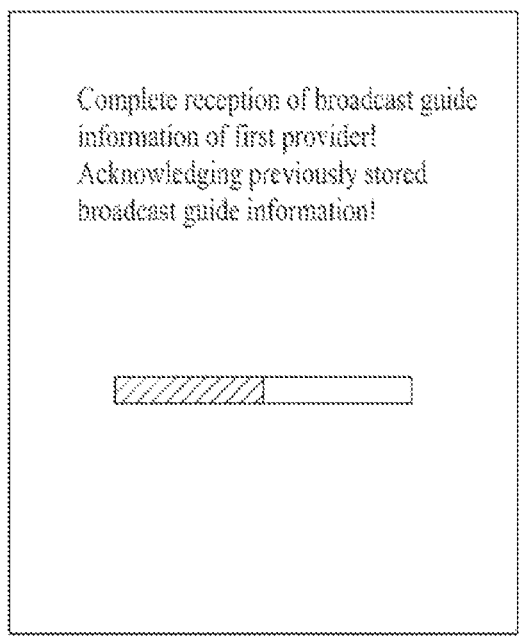
Figure 18B:
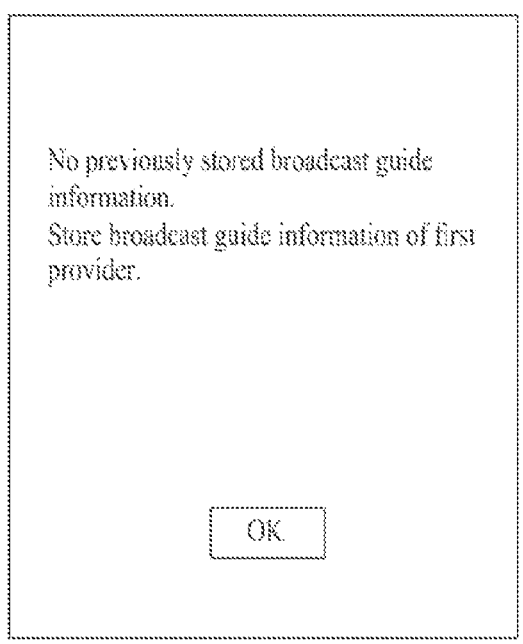

If the broadcast guide information is completely received, the mobile terminal 100 may identify whether the broadcast guide information has been stored in the memory unit 160 and may notify the user that the mobile terminal is identifying whether the broadcast guide information has been stored in the memory unit, as illustrated in FIG. 18A. Referring to FIG. 18B, if the broadcast guide information has not been stored in the memory unit 160, the mobile terminal 100 can store the received broadcast guide information in the memory unit.

Alternatively, referring to FIG. 18C(a), if the broadcast guide information has been stored in the memory unit 160, the mobile terminal 100 identifies whether the previously stored broadcast guide information is matched with the received broadcast guide information. If the previously stored broadcast guide information is not matched with the received broadcast guide information, the mobile terminal 100 updates the previously stored broadcast guide information based on the received broadcast guide information, as illustrated in FIG. 18C(b). If the previously stored broadcast guide information is matched with the received broadcast guide information, the mobile terminal 100 does not store the received broadcast guide information in the memory unit 160.

According to the present invention, the mobile terminal 100 can output the broadcast guide information via the output unit 150 in accordance with the first to third embodiments. Specifically, in the second or third embodiment, the mobile terminal 100 can output the broadcast guide information corresponding to the data type selected by the user. This will be described in more detail with reference to FIG. 19A and FIG. 19B.

Referring to FIG. 19A, the mobile terminal 100 can output broadcast guide information having a data type of 'Schedule data'. The 'Schedule data' may refer to broadcast plan information according to broadcast time and broadcast schedule of each broadcast contents or broadcast program.

For example, if a plurality of broadcast channels managed by a specific broadcast provider is provided, the mobile terminal 100 can output broadcast guide information of schedule data for each of the plurality of broadcast channels, as illustrated in FIGS. 19A(a) and 19A(b).

Referring to FIG. 19B(a), the mobile terminal 100 can output broadcast guide information having a data type of 'Contents data.' The 'Contents data' may refer to name, plot, guest information, relevant web site address information and background music information of broadcast contents. For example, the mobile terminal 100 can output broadcast guide information of contents associated data for specific broadcast contents selected by the user.

Referring to of FIG. 19B(b), the mobile terminal 100 can output broadcast guide information having a data type of 'Preview data.' The 'Preview data' may refer to previous announcement broadcast data of corresponding broadcast contents.

For example, the mobile terminal 100 can output broadcast guide information of 'Preview data' for specific broadcast contents selected by the user. Although not shown, the broadcast guide information may include various types of data without being limited to the 'Schedule data,' the 'Preview data,' or the 'Contents data' as previously described.

Also, the mobile terminal 100 can receive broadcast associated information such as channel connection information, broadcast guide receiving associated information, or broadcast guide information while performing the broadcast reception and output operations. This will be described in more detail with reference to FIG. 20A and FIG. 20B.

FIG. 20A illustrates a mobile terminal 100 receiving broadcast associated information corresponding to a broadcast channel that provides broadcast contents currently in service. The mobile terminal 100 can receive broadcast associated information corresponding to a first broadcast channel while outputting broadcast contents provided from the first broadcast channel.

The mobile terminal 100 can display an acknowledgement identifier 2010 of broadcast associated information on a portion of the screen while receiving the broadcast associated information, as illustrated in FIG. 20A(a). If the broadcast associated information is completely received, the mobile terminal 100 allows the user to select whether to identify the broadcast associated information by notifying the user that the broadcast associated information has been completely received 2020, as illustrated in FIG. 20A(b).

Although not shown, the mobile terminal 100 can receive broadcast associated information corresponding to all broadcast channels managed by the broadcast provider that manages the first broadcast channel while receiving/outputting broadcast contents provided by the first broadcast channel. The embodiment identified in FIG. 20A can be applied to the mobile terminal 100.

If broadcast frequency bandwidths of the broadcast channels managed by the broadcast provider that manages the first broadcast channel are different from one another, the mobile terminal 100 can receive broadcast contents or broadcast associated information provided from the respective broadcast channels by using a plurality of tuners. FIG. 20B illustrates a mobile terminal 100 receiving broadcast associated information corresponding to a second broadcast channel instead of a first broadcast channel, which provides broadcast contents currently in service. It is assumed that a broadcast provider that manages the first broadcast channel is different from a broadcast provider that manages the second broadcast channel.

The mobile terminal 100 can receive broadcast associated information corresponding to the second broadcast channel while outputting broadcast contents provided from the first broadcast channel. In more detail, the mobile terminal 100 can display an acknowledgement identifier 2030 of broadcast associated information on a portion of the screen while receiving the broadcast associated information, as illustrated in FIG. 20B(a). If the broadcast associated information is completely received, the mobile terminal 100 allows the user to select whether to identify the broadcast associated information by notifying the user that the broadcast associated information has been completely received 2040, as illustrated in FIG. 20B(b).

If the broadcast frequency bandwidths of the first and second broadcast channels are different from each other, the mobile terminal 100 can receive broadcast contents or broadcast associated information provided from the respective broadcast channels by using a plurality of tuners. Also, according to the present invention, the mobile terminal 100 can receive the broadcast associated information by using a data communication network instead of a broadcast network.

The mobile terminal 100 can receive the broadcast associated information by using the data communication network regardless whether a broadcast signal has been transmitted and received via the broadcast network. Alternatively, the mobile terminal 100 can receive the broadcast associated information at any time by using the data communication network even if another application is being driven. The mobile terminal 100 can receive data that includes network access information as access information and can receive the broadcast associated information by accessing the data communication network using the network access information included in the received data.

Structural views of data including network access information for receiving broadcast associated information using data communication will be described in detail with reference to FIG. 21A and FIG. 21B. Referring to FIG. 21A and FIG. 21B, if SG_delivery_network_type 0x03 exists in the data, it indicates that an IP based interaction channel exists via which the broadcast associated information is transmitted.

Accordingly, the mobile terminal 100 can acquire URL information including the broadcast associated information from a SG_entrypoint_URL parameter within a SG_bootstrap_data descriptor relevant to the interaction channel. As a result, the mobile terminal 100 can receive the corresponding broadcast associated information by accessing a server of a corresponding broadcast provider via background while implementing application relevant to data communication, such as WiBro or Wi-Fi.

According to one embodiment of the present invention, the described broadcast controlling methods can be implemented in a program recorded medium as computer-readable codes. The computer-readable media include all types of recording devices in which data readable by a computer system are stored. The computer-readable media include ROM, RAM, CD-ROM, magnetic tapes, floppy discs, and optical data storage devices, for example, and also include carrier-wave type implementations such as transmission via Internet.

The configurations and methods of the embodiments described herein are not limited to the disclosed mobile terminal and method for controlling broadcast in a mobile terminal. All or part of the embodiments can be configured by selective combination, whereby various modifications can be made in the embodiments.

The present invention has several advantages. First, a mobile terminal can allow a user to select a specific broadcast provider or a specific data type for broadcast guide information. Second, since the mobile terminal can selectively receive only broadcast guide information corresponding to the specific broadcast provider or the specific data type, the time required to receive the broadcast guide information can be reduced. Finally, since the mobile terminal can stop receiving the broadcast guide information when sensing reception of the broadcast guide information corresponding to the specific data type, the time required to receive the broadcast guide information can be reduced.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile terminal comprising:
   an output unit configured to display a broadcast provider list that includes at least one broadcast provider having corresponding broadcast guide information;
   a user input unit configured to receive a selection of a specific broadcast provider from the displayed broadcast provider list;
   a wireless communication unit configured to receive channel connection information for each of the at least one broadcast provider; and
   a controller configured to extract channel connection information corresponding to the selected specific broadcast provider from the received channel connection information and to control the wireless communication unit to use the extracted channel connection information to receive broadcast guide receiving associated information and broadcast guide information each corresponding to the selected specific broadcast provider,
   wherein:
   the output unit is further configured to display a data type list that includes at least one data type corresponding to the received broadcast guide information;
   the user input unit is further configured to receive a selection of a specific data type from the displayed data type list; and
   the controller is further configured to extract broadcast guide receiving associated information corresponding to the selected specific data type from the received broadcast guide receiving associated information and to control the wireless communication unit to use the extracted broadcast guide receiving associated information to receive broadcast guide information corresponding to the selected specific data type from the received broadcast guide information corresponding to the selected specific broadcast provider.

2. The mobile terminal of claim 1, wherein the channel connection information includes broadcast guide receiving associated information for each of the at least one broadcast provider.

3. The mobile terminal of claim 1, wherein at least a consolidated broadcast frequency band common to each of the at least one broadcast provider or an individual broadcast frequency band designated for each of the at least one broadcast provider is assigned to the at least one broadcast provider.

4. The mobile terminal of claim 1, wherein:
   the user input unit is further configured to receive a selection of a specific broadcast channel from a plurality of broadcast channels managed by the selected specific broadcast provider; and
   the controller is further configured to extract broadcast guide receiving associated information corresponding to the selected specific broadcast channel from the received broadcast guide receiving associated information and to control the wireless communication unit to use the extracted broadcast guide receiving associated information to receive broadcast guide information corresponding to the selected specific broadcast channel.

5. The mobile terminal of claim 1, wherein the controller is further configured to:
   determine whether valid broadcast guide information corresponding to the selected specific broadcast provider was previously stored; and
   control the wireless communication unit to receive the broadcast guide information corresponding to the selected specific broadcast provider if valid broadcast guide information was not previously stored.

6. The mobile terminal of claim 5, wherein determining whether valid broadcast guide information corresponding to the selected specific broadcast provider was previously stored comprises:
 determining whether a duration of previously stored broadcast guide information corresponding to the selected specific broadcast provider has expired; and
 determining whether the previously stored broadcast guide information is valid according to the comparison.

7. The mobile terminal of claim 1, wherein;
 the controller is further configured to control the output unit to display a window indicating whether valid broadcast guide information was previously stored.

8. The mobile terminal of claim 7, wherein the received broadcast guide receiving associated information includes channel connection information that provides broadcast guide information for each of the at least one data type.

9. The mobile terminal of claim 7, wherein the controller is further configured to control the wireless communication unit to receive broadcast guide information for broadcast identification among the received broadcast guide information corresponding to the selected specific broadcast provider.

10. The mobile terminal of claim 1, further comprising a memory unit configured to store the received broadcast guide information corresponding to the selected specific broadcast provider, wherein the controller is further configured to:
 update broadcast guide information previously stored in the memory unit based on the received broadcast guide information if the previously stored broadcast guide information corresponds to the received broadcast guide information; and
 store the received broadcast guide information in the memory unit if broadcast guide information that corresponds to the received broadcast guide information was not previously stored in the memory unit.

11. The mobile terminal comprising:
 a wireless communication unit configured to receive broadcast guide receiving associated information and broadcast guide information;
 an output unit configured to display a data type list that includes at least one data type corresponding to the received broadcast guide information;
 a user input unit configured to receive a selection of a specific data type from the displayed data type list; and
 a controller configured to extract broadcast guide receiving associated information corresponding to the selected specific data type from the received broadcast guide receiving associated information and to control the wireless communication unit to use the extracted broadcast guide receiving associated information to receive broadcast guide information corresponding to the selected specific data type.

12. The mobile terminal of claim 11, wherein the wireless communication unit is further configured to:
 receive channel connection information for each of at least one broadcast provider; and
 use the received channel connection information to receive the broadcast guide receiving associated information.

13. The mobile terminal of claim 11, wherein:
 the broadcast guide receiving associated information includes channel connection information that provides broadcast guide information for each of the at least one data type; and
 the wireless communication unit is further configured to open a channel corresponding to the channel connection information and receive the broadcast guide information corresponding to the selected specific data type via the opened channel.

14. The mobile terminal of claim 11, wherein the controller is further configured to:
 determine whether valid broadcast guide information corresponding to the selected specific data type was previously stored; and
 control the wireless communication unit to receive the broadcast guide information corresponding to the selected specific data type if valid broadcast guide information corresponding to the selected specific data type was not previously stored.

15. The mobile terminal of claim 11, wherein the controller is further configured to
 control the wireless communication unit to use the extracted broadcast guide receiving associated information to receive broadcast guide information related to broadcast identification.

16. The mobile terminal of claim 11, wherein the controller is further configured to control the wireless communication unit to receive at least the broadcast guide receiving associated information or the broadcast guide information while receiving a broadcast signal from a specific broadcast channel.

17. The mobile terminal of claim 11, wherein the controller is further configured to control the output unit to output the received broadcast guide information corresponding to the selected data type.

18. A mobile terminal comprising:
 a wireless communication unit configured to receive broadcast guide receiving associated information and broadcast guide information;
 an output unit configured to display a data type list that includes at least one data type corresponding to the received broadcast guide information;
 a user input unit configured to receive a selection of a specific data type from the displayed data type list; and
 a controller configured to:
 control the wireless communication unit to use the received broadcast guide receiving associated information to receive the broadcast guide information; and
 stop receiving the broadcast guide information upon sensing reception of broadcast guide information corresponding to the selected specific data type.

19. A method for controlling broadcast in a mobile terminal, the method comprising:
 displaying a broadcast provider list that includes at least one broadcast provider having corresponding broadcast guide information;
 receiving a selection of a specific broadcast provider from the displayed broadcast provider list;
 receiving channel connection information for each of the at least one broadcast provider;
 extracting channel connection information corresponding to the selected specific broadcast provider from the received channel connection information; and
 receiving broadcast guide receiving associated information and broadcast guide information each corresponding to the selected specific broadcast provider by using the extracted channel connection information;
 displaying a data type list that includes at least one data type corresponding to the received broadcast guide information; and
 receiving a selection of a specific data type from the displayed data type list, extracting broadcast guide receiving associated information corresponding to the selected specific data type from the received broadcast guide receiving associated information, and using the extracted broadcast guide receiving associated information to receive broadcast guide information corresponding to the selected specific data type from the received broadcast guide information corresponding to the selected specific broadcast provider.

20. The method of claim 19, further comprising determining whether valid broadcast guide information corresponding to the selected specific broadcast provider was previously stored; and receiving the broadcast guide information corresponding to the selected specific broadcast provider if valid broadcast guide information was not previously stored.

21. A method for controlling broadcast in a mobile terminal, the method comprising:

displaying a data type list that includes at least one data type corresponding to broadcast guide information;

receiving a selection of a specific data type from the displayed data type list;

receiving broadcast guide receiving associated information;

extracting broadcast guide receiving associated information corresponding to the selected specific data type from the received broadcast guide receiving associated information; and using the extracted broadcast guide receiving associated information to receive broadcast guide information corresponding to the selected specific data type.

\* \* \* \* \*